United States Patent
Loce et al.

(10) Patent No.: US 7,440,139 B2
(45) Date of Patent: Oct. 21, 2008

(54) SYSTEMS AND METHODS FOR CONTROLLING A TONE REPRODUCTION CURVE USING ERROR DIFFUSION

(75) Inventors: Robert Paul Loce, Webster, NY (US); Beilei Xu, Penfield, NY (US); Reiner Eschbach, Webster, NY (US); David J. Lieberman, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 673 days.

(21) Appl. No.: 11/034,057

(22) Filed: Jan. 13, 2005

(65) Prior Publication Data

US 2006/0152764 A1  Jul. 13, 2006

(51) Int. Cl.
G06K 15/10 (2006.01)
G06K 9/36 (2006.01)
G06K 9/38 (2006.01)
G06K 9/46 (2006.01)
H04N 1/405 (2006.01)
H04N 1/40 (2006.01)
G09G 5/00 (2006.01)

(52) U.S. Cl. .................. 358/3.03; 345/616; 382/252
(58) Field of Classification Search ............ 382/252, 382/251, 232; 358/1.9, 1.1, 3.26, 3.04, 3.03, 358/3.02, 3.01
See application file for complete search history.

(56) References Cited

U.S. PATENT DOCUMENTS

| | | | | |
|---|---|---|---|---|
| 4,700,232 A | * | 10/1987 | Abt et al. ............... 348/580 |
| 5,029,019 A | * | 7/1991 | Yoshihara et al. ........... 358/447 |
| 5,436,734 A | * | 7/1995 | Yamauchi et al. ........... 358/448 |
| 5,506,699 A | * | 4/1996 | Wong ........................ 358/3.08 |
| 5,903,361 A | * | 5/1999 | Shiau et al. ................. 358/3.03 |
| 6,055,065 A | | 4/2000 | Rao et al. |
| 6,608,701 B1 | * | 8/2003 | Loce et al. .................. 358/3.09 |
| 6,652,059 B2 | * | 11/2003 | Tsutsumi .................... 347/15 |
| 6,704,123 B1 | | 3/2004 | Av-Shalom et al. |
| 6,717,700 B1 | * | 4/2004 | Sanderson et al. ......... 358/3.21 |
| 6,778,299 B2 | * | 8/2004 | Lin et al. .................... 358/3.03 |
| 7,068,396 B1 | * | 6/2006 | Gallagher et al. ........... 358/3.01 |
| 7,079,289 B2 | * | 7/2006 | Loce et al. .................. 358/3.03 |
| 2002/0080144 A1 | * | 6/2002 | Loce et al. ................... 345/589 |
| 2003/0085932 A1 | * | 5/2003 | Samra ........................ 345/853 |
| 2003/0090729 A1 | | 5/2003 | Loce et al. |
| 2003/0218780 A1 | | 11/2003 | Braun et al. |

\* cited by examiner

*Primary Examiner*—Edward L. Coles
*Assistant Examiner*—Ming Hon
(74) *Attorney, Agent, or Firm*—Oliff & Berridge, PLC

(57) ABSTRACT

A method of adjusting a TRC of an image is provided. The method involves receiving an image at an input resolution, resampling the image to a processing resolution if the imput resolution and the processing resolution are not same, processing the image using rank-ordered error diffusion, and resampling the processed image to a desired output resolution for the image if the processing resolution and the output resolution are not same.

14 Claims, 14 Drawing Sheets

| 1 | 1 | 1 | 1 | 1 | 1 |
|---|---|---|---|---|---|
| 1 | 1 | 1 | 1 | 1 | 1 |
| 1 | 1 | 1 | 1 | 1 | 1 |

| 3/5 | 5/8 | 5/8 | 5/8 | 3/5 |
|-----|-----|-----|-----|-----|
| 5/8 | 1   | 1   | 1   | 5/8 |
| 5/8 | 1   | 1   | 1   | 5/8 |
| 5/8 | 1   | 1   | 1   | 5/8 |
| 3/5 | 5/8 | 5/8 | 5/8 | 3/5 |

FIG. 7
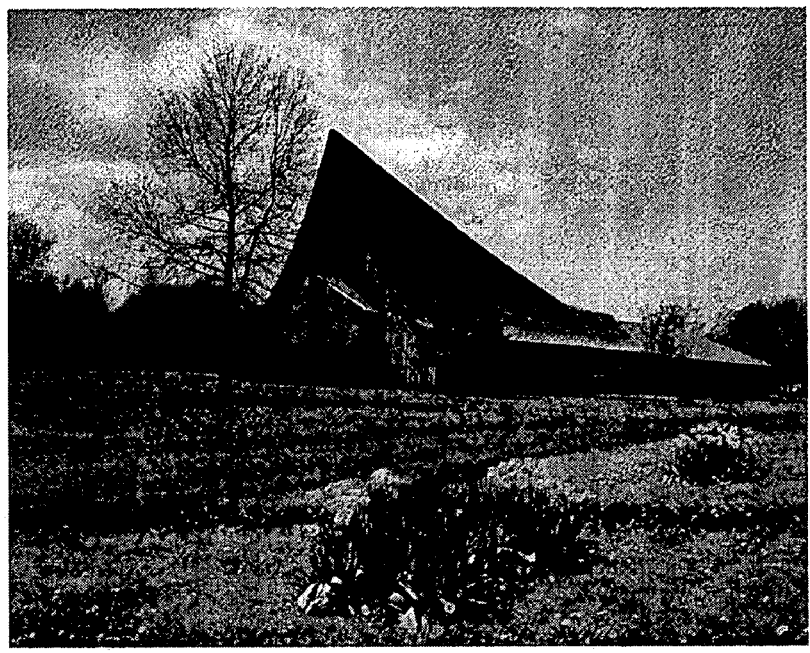
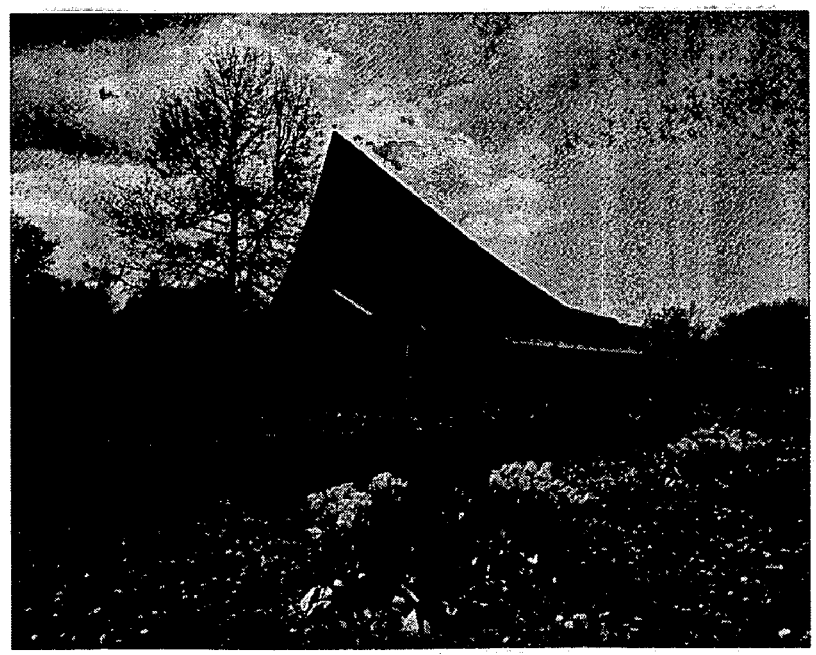
FIG. 8

FIG. 9
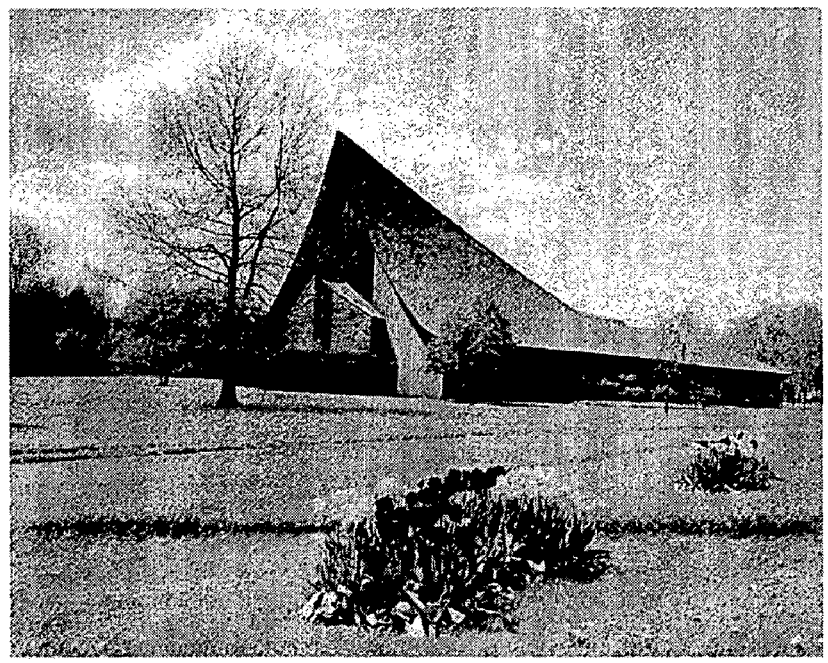
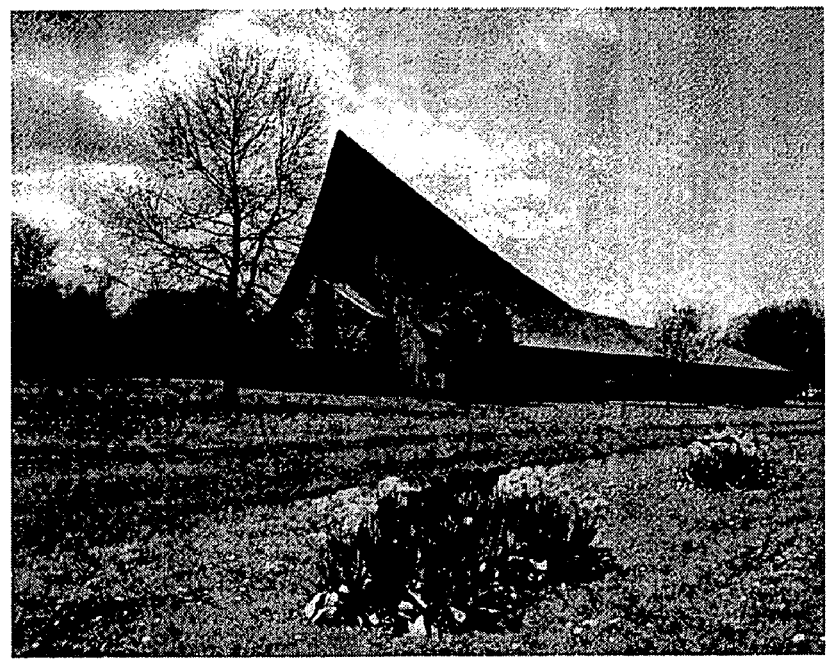
FIG. 10

FIG. 17
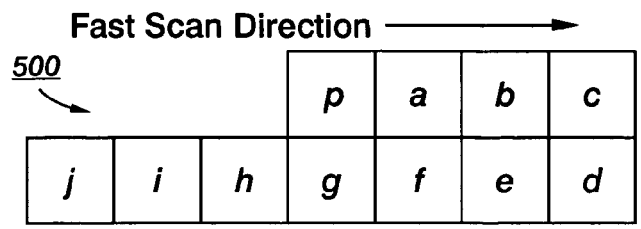
FIG. 18
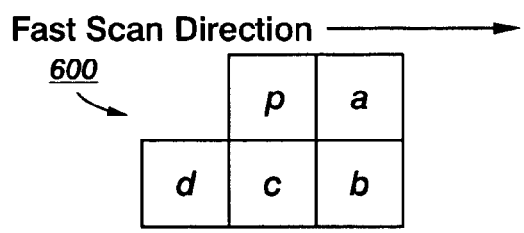
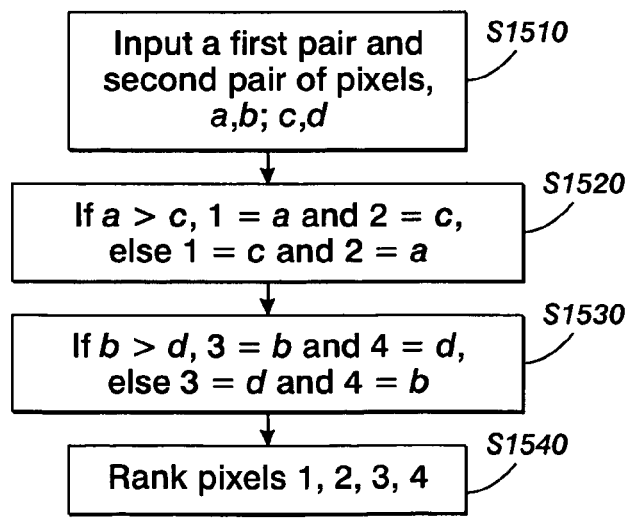
FIG. 19

SYSTEMS AND METHODS FOR CONTROLLING A TONE REPRODUCTION CURVE USING ERROR DIFFUSION

BACKGROUND

1. Field

Systems and methods for controllable tone reproduction curve (TRC) adjustment of a halftone image using error diffusion and in particular, improved rank-ordered error diffusion are provided.

2. Description of Related Art

A general goal of reprographic systems, such as, printers and printing engines, is to produce prints with a high degree of image quality. One aspect of image quality is achievement of desired tone reproduction. There are many instances when a digital halftoned image requires a modification to achieve the desired tone reproduction in the printed or displayed image. For example, when reproducing an original or scanned image with halftone structure, the quality of the reproduced image depends significantly on the compatibility between the conditions surrounding the creation of the image file and the characteristics of the print engine(s) involved in rendering the reproduced image. If the conditions differ significantly, the digital image should be modified to achieve the desired tone reproduction on the print.

Images may be formatted as contone (continuous tone) images having a wide range of tonal values or quantized images having a limited number of tonal values. Binary images are quantized images that are capable of rendering pixels of the image as one of two tonal values (e.g., "1" or "0"; "on" or "off", "marked" or "unmarked"). Thus, an image formatted as a binary image identifies each pixel of an image as either "marked" or "unmarked". When a pixel is a high addressable pixel, the pixel itself is defined by two or more spots/dots, each of which is capable of being rendered as one of two tonal values. Thus, while high addressable pixels are still limited to a limited number of tonal values, they can help improve the quality of the reproduced image.

When an original image is formatted as a contone image and the marking or print engine being used to reproduce the image is a digital system which is capable of rendering pixels in a limited number of tonal values, such as a binary system or a high addressable system, to render the reproduced image, the binary or high addressable system subjects the original contone image to a "halftoning" process in order to increase the range of tonal values (gray or color levels) and to generate a binary image which substantially emulates the contone image using a pattern of pixels which approximate contone values. Dithering and error diffusion, such as, rank ordered error diffusion (ROED) are examples of halftoning processes which are known in the art. ROED is described, for example, in U.S. Patent Publication No. US 2003/0090729, which is hereby incorporated by reference in its entirety.

Cell-based, or tile-based, halftoning is a process which defines a pattern of pixel thresholds or a growth sequence as a halftone cell and that defined pattern may be used repeatedly during processing of an image. The pixels in the halftone cell are numbered in a specific order and the numbering identifies the sequence in which each of the pixels of the halftoned image is turned "on" or "off". This numbering is called a "growth order". The number of pixels processed by a halftone growth order within a halftone cell defines the tonal range of the halftone cell. For example, a 2×2 halftone cell (i.e., 4 pixel halftone cell) can have 5 different tonal values (e.g., black if all four pixels are "on", white if all four pixels are "off", and three intermediate shades of gray depending on whether one, two or three of the four pixels are "on").

When a halftone image is to be printed, it is highly unlikely that the ink spots of the printing system being used will precisely match the pixel size and shape of the halftone image. Thus, the same print-ready image may appear different when rendered on different print engines for a variety of reasons including, different ink and/or toner materials, different substrates (e.g. papers), different marking processes, different halftones, or a different physical state for the given marking engine. The resulting engine dependent responses can be summarized by a collection of print engine tone reproduction curves (TRCs). Many image quality problems, such as, darkness shifts, changes in contrast, punch through artifacts in the highlights, and clipping in the shadows may occur when an incorrect print engine TRC is considered during the generation of the binary file. For these and other reasons, it is customary to prepare images based on the print engine dependent TRCs of the target printer.

The TRC or calibration curves of a printer are specific to each printing system and are typically experimentally derived using known methods. Therefore, when a contone image is received by a binary image reprographic system, the reprographic system generally processes the image considering the TRCs of the target print engine.

A large amount of print-ready binary halftone images exist in image archives as legacy documents or in "far away memory" such as fax machines and remote copy print. These print-ready halftone documents may have been prepared without knowledge of a given or desired print engine, and may have been prepared assuming a different printer, real or virtual. If the images were in a contone state, a simple TRC operation could be performed to modify the gray levels of the digital image so that they print with the desired tones. For binary images, such a simple operation is not possible given that each pixel is defined as one of two different possible values. Coarse adjustment of darkness and lightness can be achieved simply by toggling black and white pixel values within the image data as desired. For example, to darken and image, toggling white pixels to black can be achieved using morphological operations, and to lighten an image, toggling black pixels to white can be performed. This results in very coarse lightness/darkness adjustment and generally leads to sub-optimal results.

A similar problem occurs when attempting to print a scanned halftone image. Typically, if the frequency of a scanned halftone image is sufficiently low, for example, below 120 cpi, the particular tone reproduction characteristics of many existing reproduction systems has minimal effect. In this situation, the image is often reproduced with its given halftone screen (i.e., no de-screening) by employing simple thresholding, error diffusion or similar processing. While this halftone replication method works well for some very low frequency screens, with middle frequency and higher frequency screens, the print engine tone response has a more significant effect and can introduce unwanted artifacts that degrade image quality. Thus, higher frequency halftones are typically low pass filtered (de-screened), passed through a contone TRC operation, and then re-screened with a halftone that is suitable for the intended printer. While the above process can reproduce a scanned image, it has some drawbacks. The de-screening process typically introduces blur into the image. Furthermore, although passing scanned halftones using error diffusion can be used to reproduce low frequency halftone screens without introducing serious artifacts, it does not ensure the rendered image has compact halftone dots resulting in images that are prone to noise and instability.

To help improve the quality of the reproduced image, some methods have been developed for adjusting TRCs. For example, U.S. Pat. No. 6,717,700 discloses a method for adjusting a print-ready binary image based on the difference between the TRC of the original printer and the TRC of the target printer being used to reproduce the original or scanned image. That is, an electronic binary image is converted to another electronic binary image that compensates for the differences between printers, based on the TRC of each printer, so that a target printer can more closely emulate how the image would appear if printed by the originally intended printer.

U.S. Pat. No. 6,055,065 also discloses a method for matching print outputs from two different characteristics. According to this method, a printing decision matrix to be used by the second printer is generated based on the printing decision matrix used by the first printer, the characteristics of the first printer and the characteristics of the second printer.

U.S. Pat. No. 6,704,123 discloses a method for applying tonal correction to a binary halftone image formatted in a bit-mapped manner. In the method disclosed therein, only the edge pixels of an image are modified based on the average tonal value for each selected edge pixel, as calculated from the original image, and a calibrated tone obtained from a supplied calibration curve for the target pixel to be used to reproduce the image. By only modifying the edge pixels the halftone clusters of the original binary halftone image simply inflate or shrink without generating new isolated pixels or clusters.

U.S. Patent Publication No. 2003/0218780 discloses a technique for adjusting the dot sizes of bitmap image files. The technique disclosed therein identifies the edges of the halftone dots and either selectively adds or removes binary pixels to or form these edges to control the size of the halftone dots.

The prior methods have several shortcomings such as, they may focus on simple lighter/darker adjustments rather than specification of well controlled TRCs, they may not be computationally efficient or be readily applicable to high speed hardware implementation, and they may lead to halftone dots that are not compact thereby causing noise and instability. What is needed is a hardware friendly and efficient method of applying a tone reproduction curve to a halftoned image while maintaining the integrity of the halftone dots.

SUMMARY OF EXEMPLARY EMBODIMENTS

Exemplary embodiments described herein provide for a means to adjust the tone reproduction characteristics of a halftone image. Optional features and possible advantages of various aspects of this invention are described in, or are apparent from, the following detailed description of exemplary embodiments of systems and methods which implement this invention.

A tone reproduction curve controller including a digital halftone image receiver, a local gray value estimator, a modification value determiner, a pixel value modifier, and a pixel quantizer is provided. The local gray value estimator receives the received digital halftone image from the digital halftone image receiver and estimates a local gray value of a selected target pixel and a selected neighboring area of the selected target pixel. The modification value determiner determines a modification value for the selected target pixel based on a relationship between the estimated local gray value and a desired gray value. The pixel value modifier modifies a pixel value of the selected target pixel using the determined modification value. The pixel quantizer determines a quantization error for the selected target pixel and selects a diffusion mask relating to the target pixel and pixels neighboring thereto, wherein if the determined quantization error is not equal to zero, the determined quantization error is diffused to the neighboring pixels based on the selected diffusion mask.

A method for controlling a tone reproduction curve of a halftone digital image is provided. The method involves receiving the halftone digital image, selecting a target pixel and a neighborhood area of the selected target pixel, estimating a local gray value of the selected target pixel and the selected neighborhood area, optionally choosing from among a plurality of gray values based on segmentation tags, determining a modification value for the selected target pixel based on a relationship between the estimated local gray value and a desired gray level and optionally on the binary state of the original target pixel and pixels adjacent thereto, and modifying a pixel value of the selected target pixel using the determined modification value, determining a quantization error for the selected target pixel of an image. If the determined quantization error is not equal to zero, the method further involves selecting a diffusion mask, the mask relating to the target pixel and pixels adjacent thereto, and diffusing the determined quantization error to at least one pixel based on the selected diffusion mask.

A method of adjusting a TRC of an image is provided. The method involves receiving the image, the received image being at an input resolution, resampling the image to a processing resolution if the input resolution and the processing resolution are not same, processing the image using rank-ordered error diffusion, and resampling the processed image to a desired output resolution for the image if the processing resolution and the output resolution are not same. This aspect includes the instance of vector quantization, wherein a dimension of the output resolution is a fixed multiple of the input resolution, requiring the processed image to contain a plurality of output pixels (a.k.a. vector) corresponding to each and every target pixel of the received image.

BRIEF DESCRIPTION OF THE DRAWINGS

Exemplary embodiments will be described in detail, with reference to the following figures, in which:

FIG. 7 illustrates an original halftoned image;

FIG. 8 illustrates a darkened reproduction of the original halftoned image, shown in FIG. 7, generated using an exemplary method for controllable TRC;

FIG. 9 illustrates a lighter reproduction of the original halftoned image, shown in FIG. 7, generated using an exemplary method for controllable TRC adjustment;

FIG. 10 illustrates a higher contrast reproduction of the original halftoned image, shown in FIG. 7, generated using an exemplary method for controllable TRC adjustment;

FIG. 17 illustrates a mask employable for a full ROED algorithm for a target pixel;

FIG. 18 illustrates an exemplary mask employable for an ROED algorithm employing features described herein;

FIG. 19 illustrates a flow chart of 2, 2-way rank ordering; and

DETAILED DESCRIPTION OF EXEMPLARY EMBODIMENTS

Figure 1:
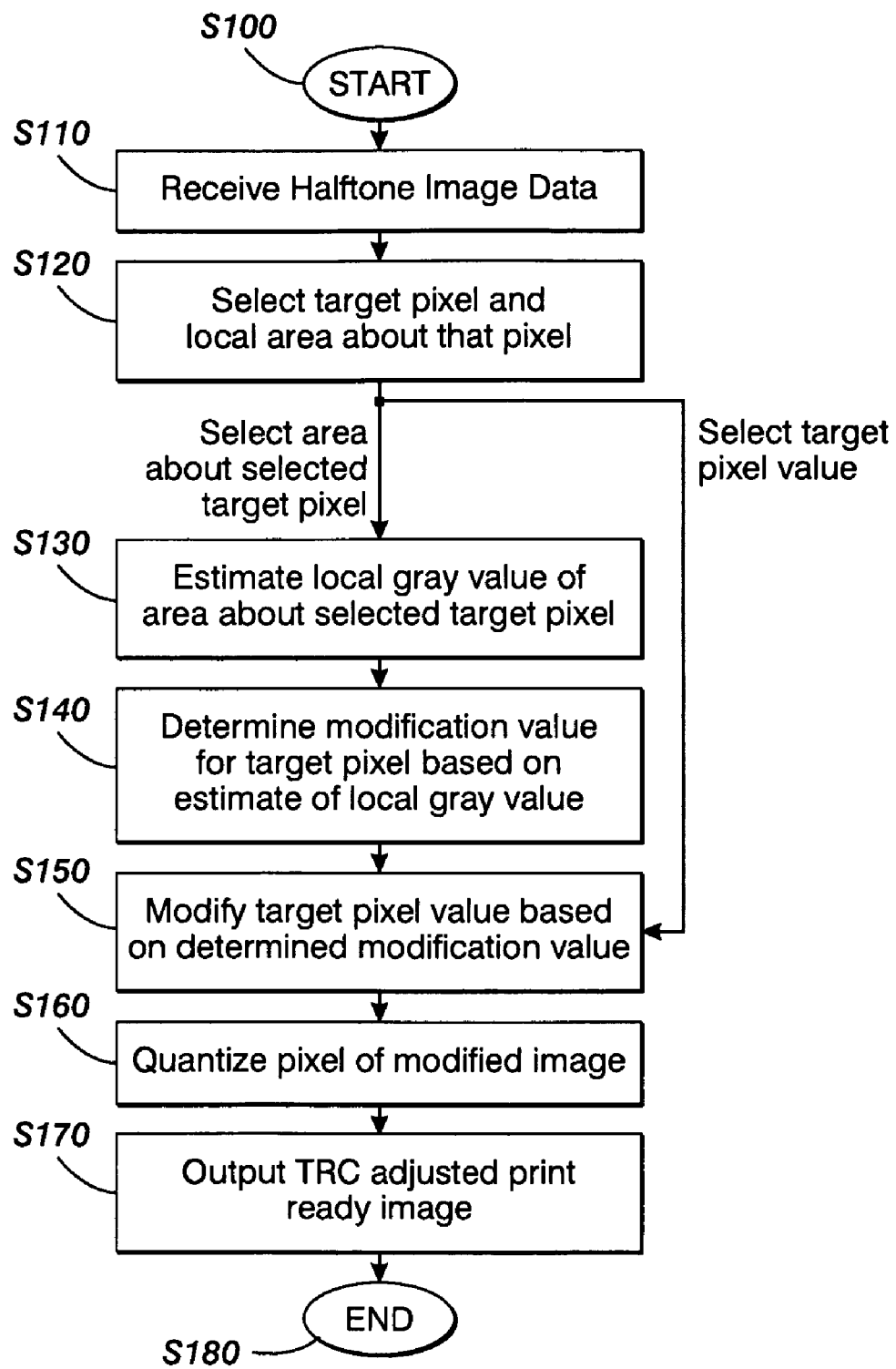
FIG. 1 illustrates a flow chart of an exemplary embodiment of a general system-level process for controllable adjustment of a TRC.

Throughout the following description, numerous specific structures/steps are set forth in order to provide a thorough understanding of the invention. The invention can be practiced without utilizing all of these specific structures/steps. In other instances, well known elements have not been shown or described in detail, so that emphasis can be focused on the invention.

It will become evident from the following discussion that embodiments of the present application set forth herein, are suited for use in a wide variety of printing and copying systems, and are not necessarily limited in application to the particular systems illustrated. For example, to avoid overly complicating the following description of the exemplary embodiments of systems and methods that practice one or more aspects of the invention, various exemplary embodiments will be described below in the context of processing monochromatic, e.g., black and white/gray scale image data (single color separation). However, one or more aspects of this invention can be applied to any digital image data, such as the processing of color images, wherein each color image separation is treated, effectively as a gray scale image, or each dimension in a color space representation is treated as a gray scale image. Accordingly, references herein to the processing of gray scale images are intended to include the processing of color images and color image separations as well.

There are many image manipulation scenarios where it is very desirable to modify the TRC of a halftoned image. As discussed above, a halftoned image is an image which has undergone a halftoning process for approximating continuous-tone values using a pattern of pixels. One such scenario includes emulation controls, wherein printing legacy images that have been rendered in accordance with a specific target print engine, but are printed on a different destination print engine. Retargeting these documents require modification of the tones of a halftoned image to account for differences between the target and destination print engine responses. Another such scenario includes implementing user desired controls, such as, for example, lighter/darker/contrast controls which can be implemented by modifying the TRC of a halftoned image.

In describing the exemplary embodiments, the term "data" refers herein to physical signals that indicate or include information. An "image", as a pattern of physical light or a collection of data representing the physical light, may include characters, words, and text as well as other features such as graphics and pictorial content. A "digital image" is, by extension, an image represented by a collection of digital data. In a digital image composed of data representing physical light, each element of data may be called a "pixel" which is commonly used in the art and refers to a picture element. Each pixel has a location and a value. Each pixel value is a bit in a "binary form" of an image, a gray scale value in a "gray scale form" of an image, or a set of color space coordinates in a "color coordinate form" of the image. The binary form, gray scale form and color coordinate form each being a two-dimensional array defining an image. Although described herein as black and white continuous tone processing, the systems and methods described herein apply equally as well to the processing of color images, wherein each separation or color plane is k treated, effectively, as a gray scale or a continuous tone image. Accordingly, references herein to the processing of continuous tone (contone) or gray scale images is intended to include the processing of color image separations as well. Further, an operation performs "image processing" when it operates on an item of data that relates to a part or all of an image.

An image may be a high addressability image if even only a single pixel of the image is formatted, sampled or produced in one of many known scenarios, all of which may apply to various embodiments. A high addressability pixel can be a pixel comprising a plurality of high addressability pixel events, where, for example, each of the high addressability pixel events corresponds to a specific spatial placement of the writing spot with respect to the pixel and has a value that represents a property of the writing spot at that specific spatial placement. In binary high addressability pixels, for example, each high addressability pixel event is a single bit indicating whether the writing spot is "on" or "off" at the corresponding spatial placement. In general, high addressability, as used above, refers to a pixel grid where the spatial sampling of the grid is higher in one dimension than in the other dimension.

High addressability also commonly refers to an imaging method where the imaging device can position the writing spot with precision finer than the size of the writing spot. For instance, a typical spot per inch (spi) high addressability system may operate with a 40 micron writing spot, an addressability of 600/inch in the direction perpendicular to the raster lines, and an addressability of 4800/inch in the direction of the raster lines.

High addressability also refers to writing an image with a higher sampling resolution than is input to the writing system. Similarly, high addressability also refers to a pixel sampling resolution that is higher than the input resolution in at least one dimension. For example, an input resolution of 300 spi may be converted to 600 spi and that resolution conversion is referred to as high addressability.

Systems that write high addressability images typically regulate a laser or similar writing device using clock modulation, amplitude modulation, pulse width modulation, pulse width position modulation or equivalent procedures. Imaging devices other than laser scanners can also employ high addressability. For instance, ink jet devices can have drop ejection rates that yield drop placements at high addressability and LED image bars can clock the LED "on" events at rates that are high relative to the spot size and diode spacing.

One or more of the features of the exemplary embodiments described herein may be applied to any digital image, including, for example, a binary image, a continuous tone (contone) image, and a high addressability image.

FIG. 1 is a flowchart outlining an exemplary method for controllable TRC adjustment of a halftoned image. In step S100, the method is initiated and proceeds to step S110 where halftone image data is received. The process continues to step S120 where a target pixel and an area about that target pixel (i.e., neighborhood) are selected. Generally, the selected target pixel is substantially in the center of the selected area and the selected area includes at least one pixel adjacent to the selected target pixel.

The process continues to step S130, where a local gray level of a neighborhood of the selected target pixel of the halftone image is estimated. The local gray level can be calculated as an average of the gray level values of a target pixel and at least one pixel adjacent thereto. More generally, a wide-variety of known descreening operations may be used to estimate the local gray level of the neighborhood of the selected target pixel. Descreening provides a contone value for each pixel and generally, the provided contone value is an estimate of the pixel value prior to any halftoning process or an estimate of the gray level that would be perceiving on a print of the image.

Descreening may be performed using, for example, one or more of a wide-variety of known and/or later developed filtering operations. For example, various pixel-weighting schemes may be used where the weights (filter kernels) are optimized for considerations such as mediated performance across a range of halftone frequencies, or a series of several different pixel-weight filters can be used wherein each pixel-weight filter is optimized for a specific halftone threshold array. The pixel-weight filter can depend on segmentation tags that summarize position dependent attributes of the target pixel, and context surrounding the target pixel.

After an estimate of a local gray level of a neighborhood of a target pixel is obtained, the process proceeds to step S140 where a modification value for the target pixel is obtained based on the estimated local gray level for the target pixel and a desired value for a pixel with that estimated local gray level. Generally, for text, line art, and each halftone frequency of interest, there is a one-to-one relationship between input gray level (i.e., estimated local gray level) and desired output gray level. To achieve an emulation control, this one-to-one gray level correspondence can depend upon the characteristics of the specific target and destination printer combination. These gray level correspondences may be defined via a look-up table (LUT). For example, relationships between input gray levels and desired output gray levels may be provided to enable an increase or decrease in overall darkness, contrast or any TRC operation. Further, the relationships may be defined, for example, in terms of an input gray level and a desired output gray level or in terms of an input gray level and a modification value for obtaining the desired output gray level. In addition, a collection of these relationships can be indexed by tags that summarize content such as text or line-art, specific halftone frequencies of interest, and by specific target-destination printer combinations. The modification value approach is elected for purposes of the following description of exemplary embodiments.

For many marking/print engines, the effect of a given modification value will be scaled by the slope of the printer TRC, as it relates to the final density response of the printer. For any fixed gray level, relatively small differences in the modification value will result in a roughly linear engine responses about a given halftone level because the method is well behaved, in that it substantially maintains compactness of the halftone dots.

For cases where the response is non-linear, a calibration process may be performed to determine the modification value. The calibration process may measure, for example, the effect of the modification values at various gray levels for various halftone frequencies and various target and destination printer combinations of interest. For example, for an input gray level, a plurality of different gray level modification values may be added to different patches and then printed. By examining the printed output, the relationship between a modification value and the density value for the input gray level is determined. Such an operation may be performed for a plurality of input gray levels. This calibration may be factored into the LUT in a manner similar to known methods and/or later developed methods for compensating for the marking/printer engine response with a TRC or halftone thresholds.

Figure 2:
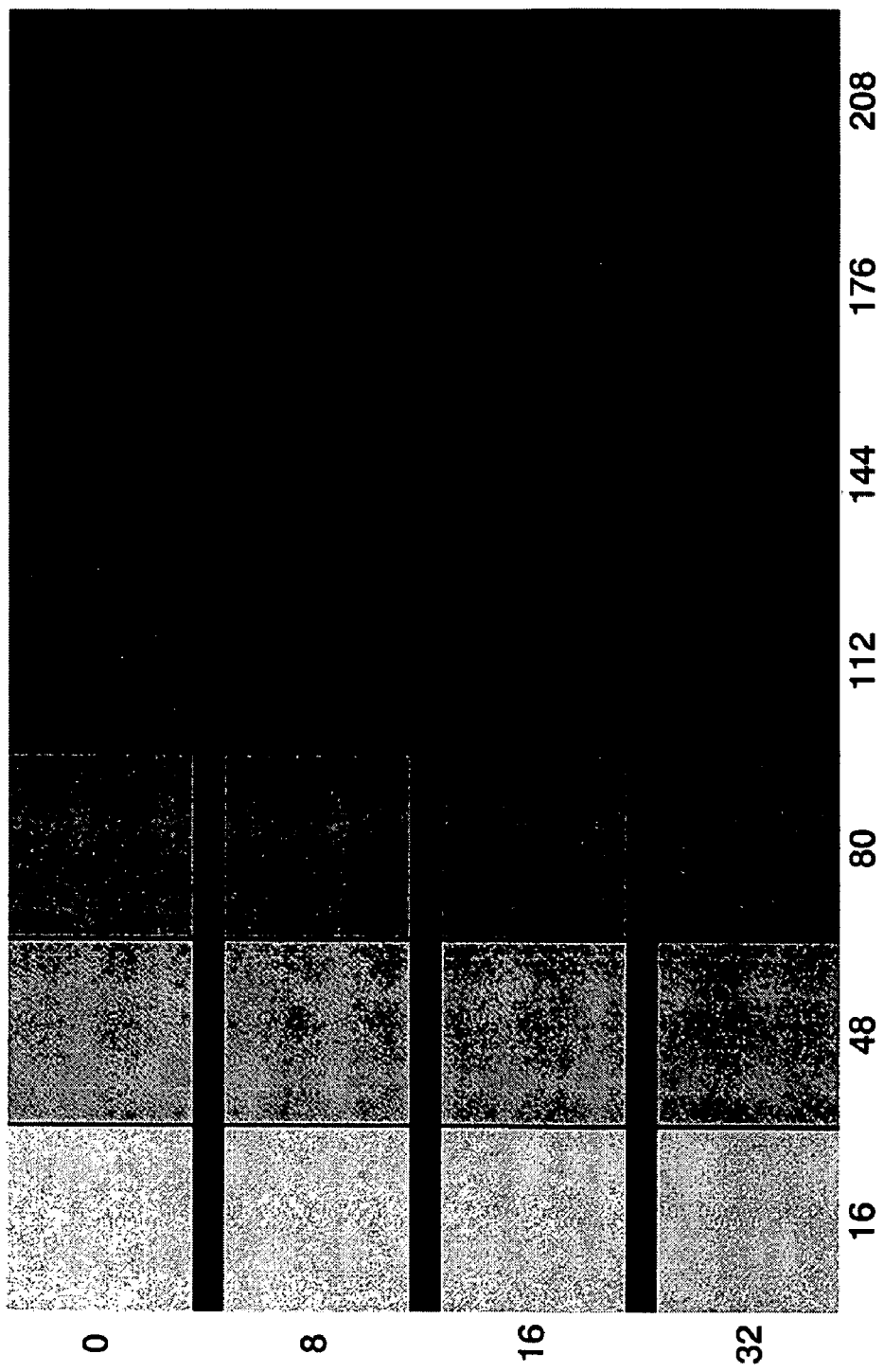
FIG. 2 illustrates a gray wedge possessing 7 gray levels.

For example, FIG. 2 illustrates a "copy darker" study on a gray wedge image possessing seven different levels. The top row is considered the input level gray levels of 16, 48, 80, 112, 144, 176 and 208, proceeding from left to right. The second, third and fourth rows correspond to the modified darkness levels of 8, 16 and 32, respectively. If the image processing and marking/printing process yields a perfectly unity slope linear response, the bottom row would appear to be shifted one square to the right compared to the top row (input level). Generally, side-by-side comparisons have shown that the mid-tone squares generally appear to follow a unity slope linear behavior very well while a small amount of calibration adjustment is generally needed for the toe and shoulder. A target, such as the one shown in FIG. 2, may be used as a calibration target to obtain modification values.

After the modification value is determined in step S140, the process continues to step S150 wherein the determined modification value for the selected target pixel is utilized to modify the selected target pixel value (see arrow from S120 to S150). Generally, the determined modification value is added to or subtracted from the target pixel value to generate a modified target pixel value (i.e., a pixel of the modified image). However, the modification value may be used to modify the selected target pixel value in any manner appropriate with the characteristics of the modification value and/or relationship between the input gray levels and the desired output gray levels.

In various embodiments, (K+1)-bit quantization or greater may be supported. That is, if the selected target value and the modification value are each represented via K-bits, the modified selected target pixel value may be represented via K+1 bits. Thus, in situations where a selected target pixel has a high value and the modification value is added thereto, for example, to represent the sum in binary form, K+1 bits may be required. Such an (K+1)-bit quantization method would allow for the true value of such a sum, for example, to be processed.

After the target pixel value is modified via the determined modification value for the target pixel in step S150, the process continues to step S160 where the modified pixel is quantized in step S160 and a modified halftone image data (i.e., modified halftone image) corresponding to the target pixel is obtained. Quantization is generally performed via a halftoning process or error diffusion process. The quantization may have a context dependency that reduces, or preferably avoids, the creation of small isolated high addressable dots (and holes) that are difficult to reproduce reliably. Moreover, any suitable known quantization method may be employed to generate print-read image data for the TRC adjusted image. For example, unweighted ROED may be used. If ROED is used and the input image is in binary format, some form of blurring is applied to the binary pixel values to obtain a distribution of gray values for the neighboring pixels for the purpose of ranking those pixels. Alternatively, error diffusion directed to a new clustered structure, for example, may be used, such as in U.S. Pat. No. 5,317,653. After the modified target pixel value is quantized, the process proceeds to step S170 where a TRC adjusted halftone image data is output to the print/marking engine.

The process then returns to step S120 where a next target pixel and an area about that pixel are selected and the process proceeds through steps S130-S170. Steps S130-S170 are repeated until all of or all the desired pixels of the received input image are adjusted. For example, if only a portion of a received image is to be subjected to controllable TRC adjustment, steps S130-S170 are repeated until all the pixels in that portion are adjusted. After all of the pixels of the desired portion and/or entire image are adjusted, for example, the process ends in step S180.

Figure 3:
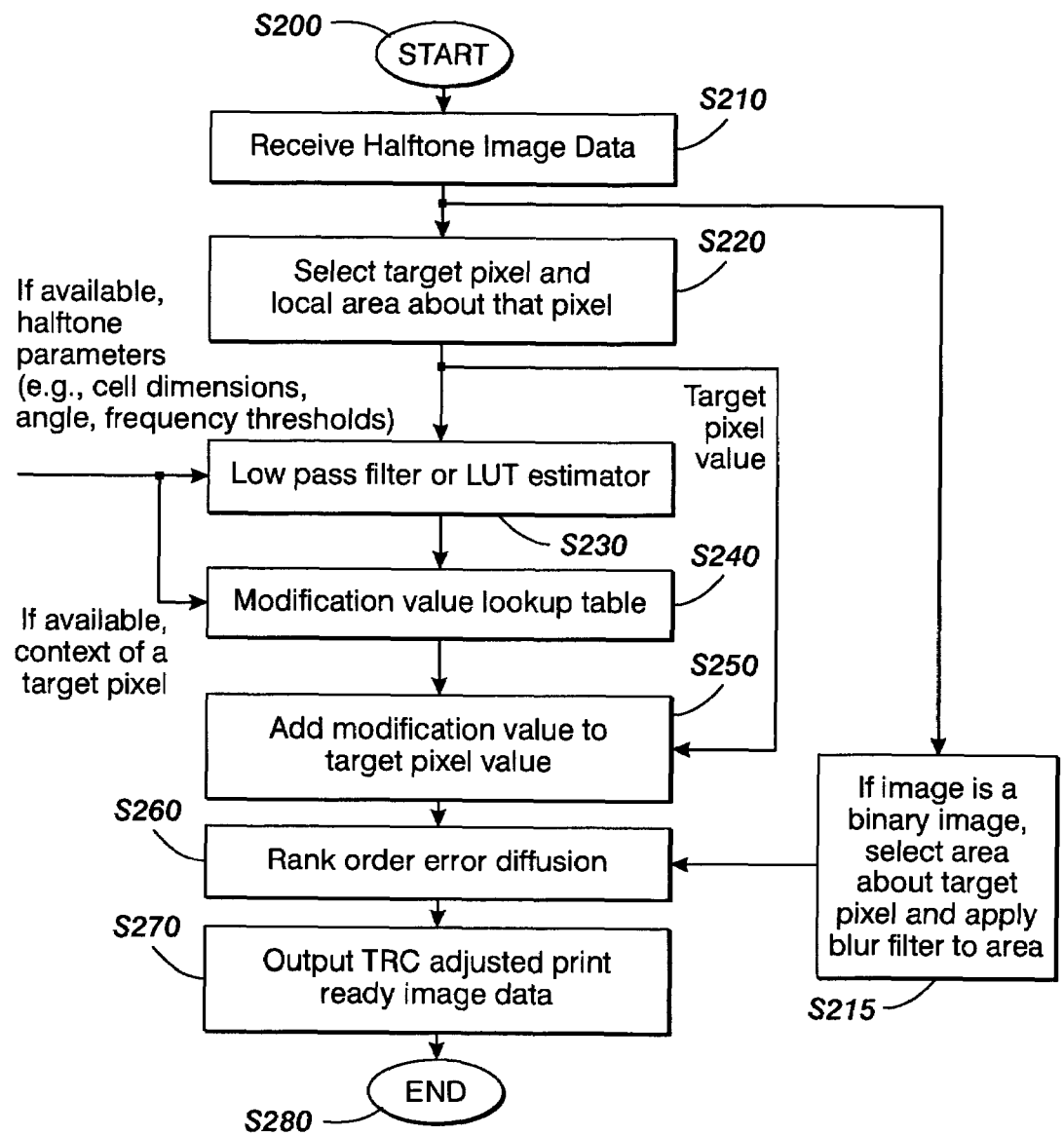
FIG. 3 is a flowchart outlining an exemplary embodiment of a general process for controllable adjustment of a TRC.

FIG. 3 is a flowchart of an exemplary process for controllable TRC adjustment of a halftoned. In step S200, the method is initiated and proceeds to step S210 where halftone image data is received. The process continues to step S220 where a target pixel and an area about that target pixel (i.e., neighborhood) are selected. As discussed above, the selected target pixel is substantially in the center of the selected area and the selected area includes at least one pixel adjacent to the selected target pixel.

The process proceeds to step S230, where in this exemplary embodiment, the local gray value of the selected neighborhood of the selected target pixel is estimated via a low pass filter with a pixel-weighting window that typically contains an integer number of halftone cells of the halftone frequency of interest, or a LUT-based estimation method. The filter provides an estimated gray value for the selected target pixel and does not modify the received image. Characteristics of the halftone cell (e.g., shape, angle, frequency) may be acquired through known means such as, for example, knowledge of the current image path, knowledge of a legacy printer or digital image frequency detection and classification algorithms.

Figures 4, 5, 6:
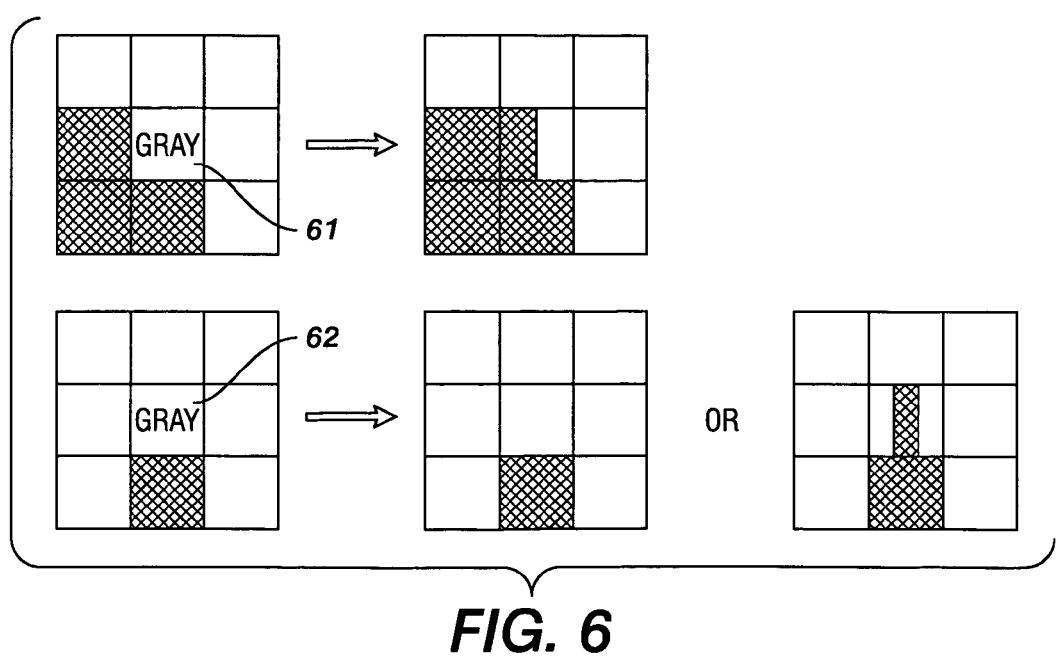
FIG. 4 illustrates an exemplary filter kernel for estimating the local gray level about a target pixel of a halftone image.
FIG. 5 illustrates another exemplary filter kernel for estimating the local gray level about a target pixel of a halftone image.
FIG. 6 illustrates exemplary context-based quantization of a target pixel.

For example, for a 141 cpi (cell per inch), 45° halftone at a resolution of 600×600 spi (spots per inch), the two exemplary filter kernels are illustrated in FIGS. 4 and 5. The exemplary filter kernel illustrated in FIG. 4 is generally advantageous because it is composed of all 1's and resides on fewer scan lines and thus, may be less costly to implement while the exemplary square filter kernel illustrated in FIG. 5 is generally advantageous because it is more compact and thus, may provide a more accurate localized gray level estimate of the selected target pixel. Other filter kernels may be advantageous in a particular system due to factors such as limited number of scan line buffers, high addressable pixel input, desire for efficient arithmetic implementation via bit shifting rather than multiplication and division, and quantization limits for the sum. Alternatively, for example, it is possible to estimate the local gray value of a neighborhood of the selected target pixel using a LUT. Knowledge of the halftone threshold array makes such a LUT-based estimation method. Such an estimation method is possible because each pixel value would be known to reside between two given thresholds and thus, some value in that range can be used as the output value. Further, another exemplary estimation architecture may be block-based rather than moving-window based.

After an estimate of the local gray level of the neighborhood of the selected target pixel is obtained, the process proceeds to step S240 where the estimated gray level is used to obtain a modification value for the target pixel via a LUT, as discussed above with regard to step S140 of FIG. 1. If available, parameters such as halftone frequency, halftone type, and orientation, and original target printer characteristics may be utilized in step S240 to obtain the modification value. After the modification value is determined in step S240, the determined modification value is used in step S250 to modify the selected target pixel value (see arrow from S220 to S250). In this exemplary embodiment, the determined modification value is added to the selected target pixel value to generate a modified target pixel value.

In this exemplary embodiment, the estimated local gray level value and the target pixel value may be represented with eight bits. Thus, the addition of the modification value and the target pixel gray level value may result in a level which, in binary representation, requires nine or more bits of quantization. In this exemplary embodiment, this sum is allowed to rise above 255 and to descend below 0 and thus, a nine-bit or greater quantization technique is utilized within the TRC adjusting and image processing module in order to increase the number of possible values beyond the typical 8-bit input range of 0 to 255.

After the determined modification value is added to the selected target pixel value in step S250, in this exemplary embodiment, rank ordered error diffusion is utilized for quantizing the modified target pixel value in step S260. Rank-ordered error diffusion (ROED) substantially maintains the original clustering of the halftone dots while introducing a small amount of, and preferably no, undesirable textures. Maintaining clustering aids in achieving stability, uniformity, low graininess and linearity. In a case where the received image is a binary image, then after receiving the image at step S210, at step S215, some form of blurring is applied to the binary pixel values in order to obtain a distribution of gray values for the neighboring pixels for the purpose of ranking those pixels. In such a scenario, the process then proceeds to step S260.

Quantizing the target pixel can be dependent on the target pixel context. For a given level of gray, the left/right/center/split positional justification depends on context. In addition, the number of high addressable pixels may be rounded up or down in order to achieve an engine dependent minimum size constraint. An example is illustrated in the top of FIG. 6, wherein a left-sided justification is chosen based on one context, and in the bottom of FIG. 6, wherein a centered justification with a minimum size constraint is imposed based on another context. In the example illustrated on the top of FIG. 6, the gray target pixel 61 is quantized based on the measured gray value of the target pixel 61 and a number of sub-pixel(s) to be turned "on" or "off" is determined based on the measured gray value. If any of the sub-pixel(s) of the target pixel are to be turned "on", in the example illustrated on the top of FIG. 6, the order of controlling sub-pixels proceeds from left to right, until the number of sub-pixel(s) determined based the measured gray value are turned "on" or "off", as necessary. In the example illustrated on the bottom of FIG. 6, the same process of quantizing the gray value of the target pixel 62 is performed and a number of sub-pixels thereof to turn "on" or "off" is determined. However, in this exemplary embodiment, control of the sub-pixels to be "on" or "off" proceeds from the center thereof outward. Further, as discussed below, if the quantized error is to low (i.e., for example a single sub-pixel, which are generally not consistently rendered), no sub-pixels of the target pixel may be turned on and the corresponding gray error (i.e., from rounding down) may be diffused. In other situations, the quantized gray value may be rounded up to a minimum threshold level and the excess gray level (i.e., from rounding up) is diffused. After the modified target pixel value is quantized, for example, by the above ROED process in step S260, the process proceeds to step S270 where a TRC adjusted halftone image data is output to the print/marking engine.

As discussed above, the process then returns to step S220 where a next target pixel and a neighboring area of that target pixel are selected. Steps S220-S270 are repeated until all of the pixels corresponding to a portion or the entire received image are modified according to steps S230-S270. After all the pixels of the desired portion or entire image, for example, are adjusted, the process ends in step S280.

FIGS. 7-11 illustrate halftoned images generated using the exemplary embodiments of systems and methods for controllable TRC adjustment. The halftone images were generated using a 141 cpi dot (3×6, 8× high addressability cell geometry). The processed images were printed on a printer with 4800×600 spi resolution. In all of the examples below, low pass filtering was used to generate a gray level estimate and ROED was used to render the image to binary form while maintaining clustering and diffusing added darkness.

FIGS. 7-11 illustrate the "Church" image. The "Church" image shows the effectiveness of one or more aspects of the exemplary systems and methods for controllable TRC adjustment and the low occurrence, and preferably the absence, of image defects when adjusting lightness/darkness/contrast of a binary image according to one or more aspects of the exemplary embodiments described herein. The sky in the Church image is very sensitive to contouring and texture artifacts. FIG. 7 illustrates the original contone image halftoned using a 141 cpi clustered dot screen.

The halftone cell geometry for a print-ready halftone image of the Church image was known and thus, the gray estimates of the contone image were performed based on the known halftone cell geometry (thus, the window of the low pass filter utilized matched the halftone cell geometry). FIG. 8 illustrates the rendered image based on controllable TRC adjustment for darkening the original image shown in FIG. 7. FIG. 9 illustrates the rendered image based on controllable TRC adjustment for lightening the original image shown in FIG. 7. FIG. 10 illustrates the rendered image based on controllable TRC adjustment for adjusting the contrast of the original image shown in FIG. 7.

In the lightness/darkness experiment of FIGS. 8 and 9, a parabolic shaped TRC was employed with its maximum deviation of 32 centered at the mid-tone. The TRC used in the contrast adjustment experiment (FIG. 10) was implemented as a sigmoid function with the steepest point centered at the mid-tone. The contrast deviation range was 16 that is, +8 and −8 from the identity TRC. Examination of the sky in FIGS. 8-9 showed no contouring, texturing, or fragmented dot defects.

Figure 11:
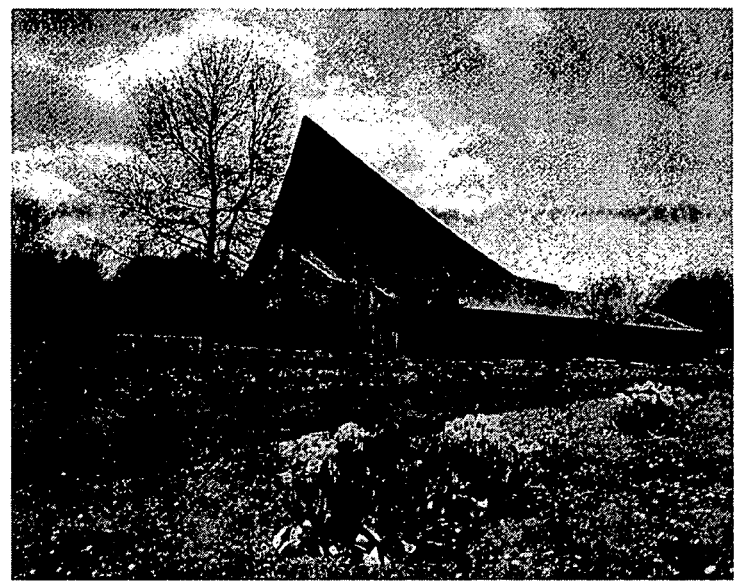
FIG. 11 illustrates a higher contrast reproduction of the original halftoned image, shown in FIG. 7, generated using an exemplary method for controllable TRC adjustment and without matching a shape of a halftone cell to a shape of a filter window.

A robustness test was performed utilizing the "Church" image shown in FIG. 7 where a non-optimal filter window was used for estimating the gray level of the target pixels. Thus, in contrast to the processes utilized for rendering the TRC adjusted "Church" images in FIGS. 7-10, in FIG. 11, the shape of the filter window utilized to estimate the local gray value of the target pixels did not match the shape of the halftone cell utilized to quantize the received print-ready image data. In practice, the exact halftone cell geometry might not be known for all applications and image paths. This example is intended to show the robustness of the exemplary embodiments with respect to mismatch of the filter window and halftone cell geometry. The contrast adjustment experiment was repeated using the 141 cpi halftone and a non-optimal filter window derived from a 212 cpi dot with a cell geometry of 2×4. Thus, a 2×4 window was applied to a 3×6 halftone cell, which is a significant amount of mismatch. As can be seen in FIG. 11, however, no obvious image artifacts are present. Thus, while it is generally desired to match the shape of the filter window with the shape of the halftone cell, based on the above experiment and the rendered image shown in FIG. 11, it is not necessary.

Figure 12:
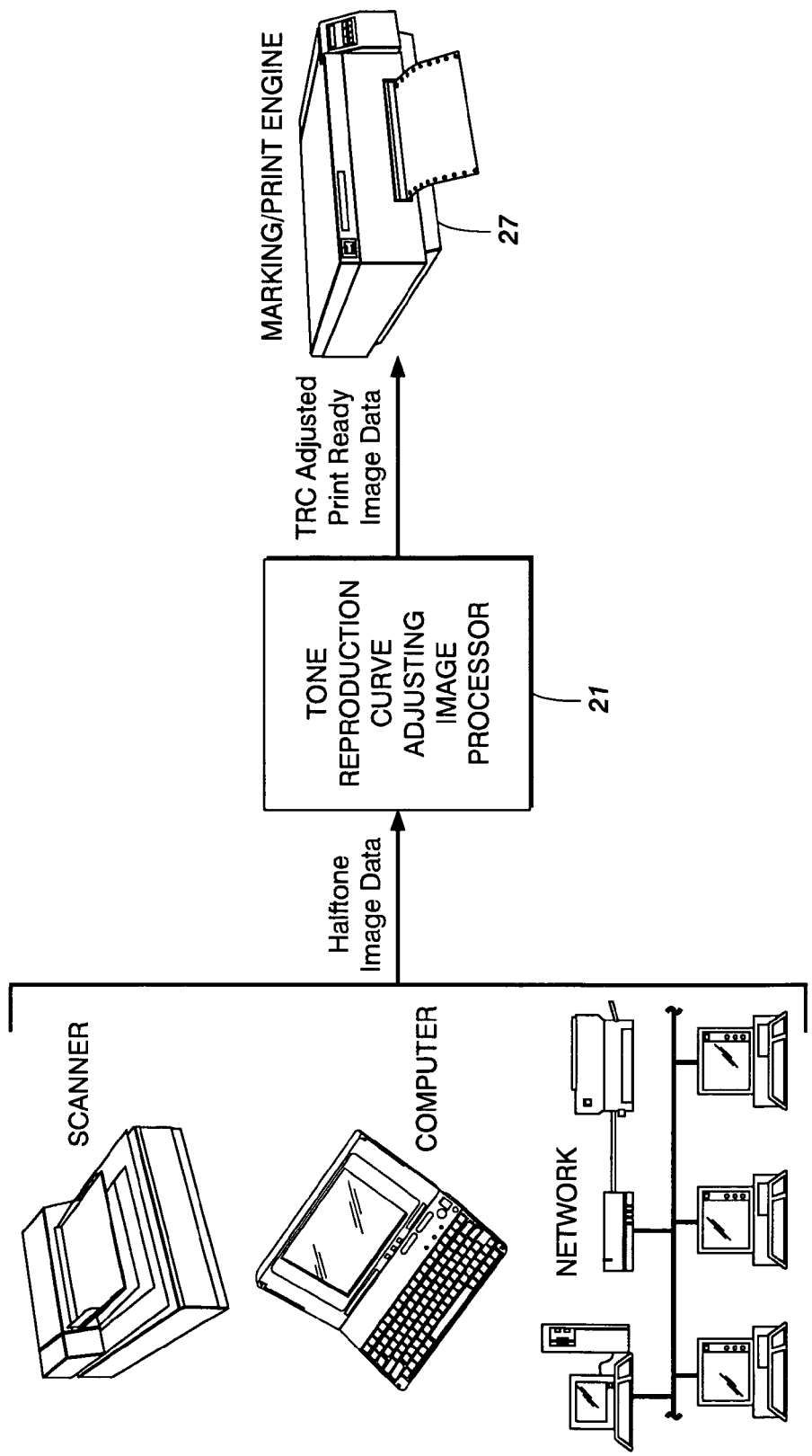
FIG. 12 illustrates an exemplary embodiment of a general system for performing controllable TRC adjustment.

FIG. 12 illustrates an exemplary general system level diagram. For example, FIG. 12 illustrates that halftone image data is received, by a TRC adjusting image processor 21, from a scanner, a computer or a network. The TRC adjusting image processor is capable of performing any known image processing method including controllable TRC adjustment, as described using exemplary embodiments herein. The TRC adjusted image output by a system in which one or more of the features for controllable TRC adjustment is/are implemented is rendered by a marking/print engine 27.

Figure 13:
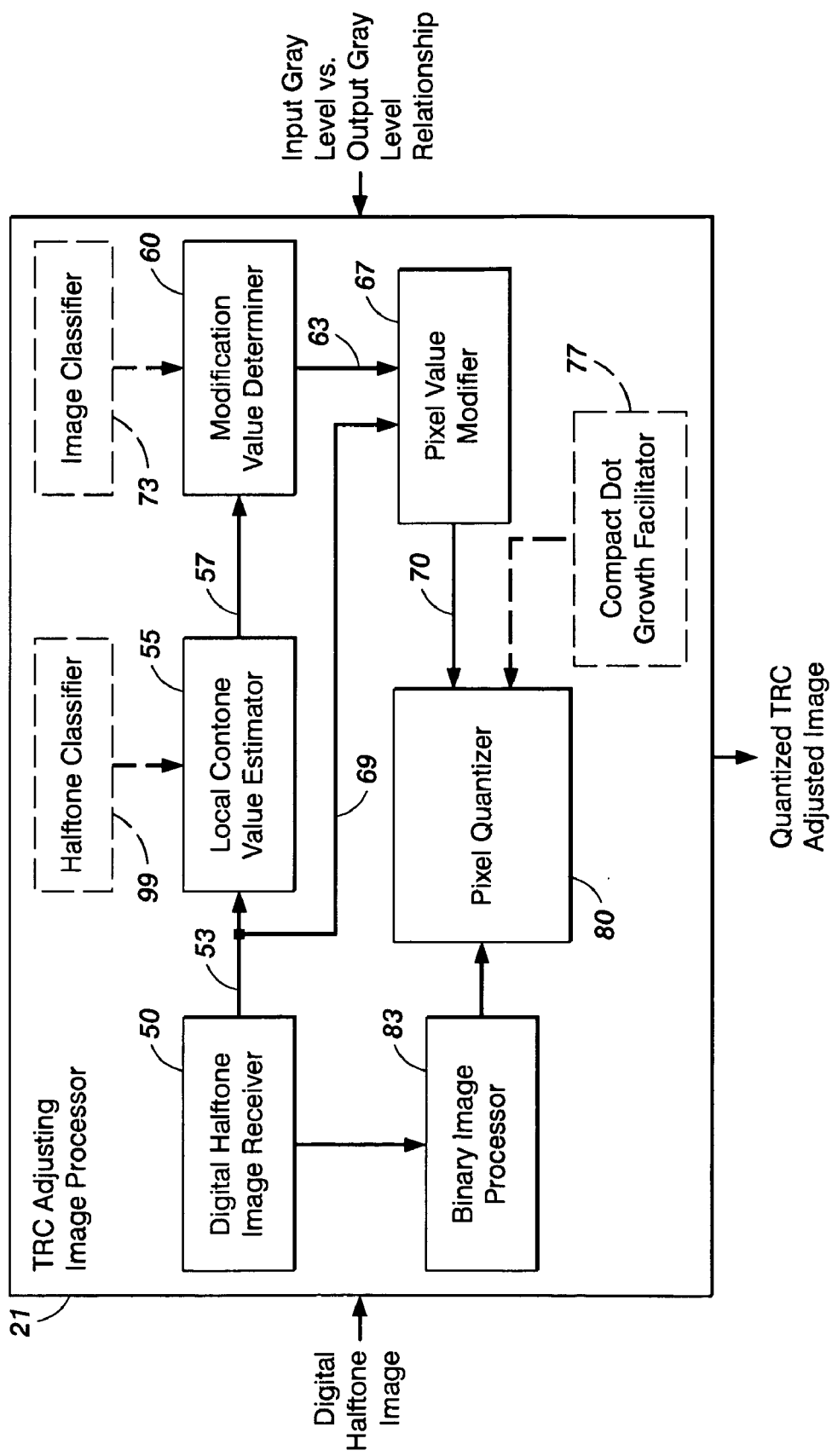
FIG. 13 is a block diagram of a TRC Adjusting and Image Process.

FIG. 13 is a block diagram of an exemplary TRC adjusting image processor 27 illustrated in FIG. 12. The TRC adjusting image processor 21 may include, for example, a digital halftone image receiving module 50, which inputs the received image 53 to the local contone value estimator 55. In various embodiments, the local contone value estimator 55 may receive halftone frequency data classifications from a halftone classifier 99 (optional). The local contone value estimator estimates the local gray level of a neighborhood of a target pixel and outputs the estimated gray level value 57 to a modification value determiner 60. The modification value determiner receives and/or has access to, for example, relationships between input gray levels and desired output gray levels. In various embodiments of the TRC adjusting image processor, the modification value determiner 60 may receive image data classifications from the image classifier 73 (optional). The modification value determiner 60 outputs a modification value 63 for the selected target pixel based on the estimate of the local gray level for the neighborhood of the target pixel to the pixel value modifier 67. The pixel value modifier 67 modifies the received selected target pixel value 67 and modifies the target pixel value by the received modification value 63. The modified target pixel value 70 is provided to the pixel quantizer 80. When the input image is in binary format, some form of blurring is applied to the binary pixel values to obtain a distribution of gray values for the neighboring pixels for the purpose of ranking those pixels. If the received image is a binary image, a binary image processor 83 determines a selected area about target pixel and applies a blur filter to the selected area. The pixel quantizer may also receive, for example, quantization rules for maximizing the repeatability of the marking engine from a context classifier 77 (optional). The pixel quantizer 80 selects a diffusion mask and quantizes the modified target pixel value 70. The quantized TRC adjusted image is then output to the print/marking engine 27, illustrated in FIG. 12.

Figure 14:
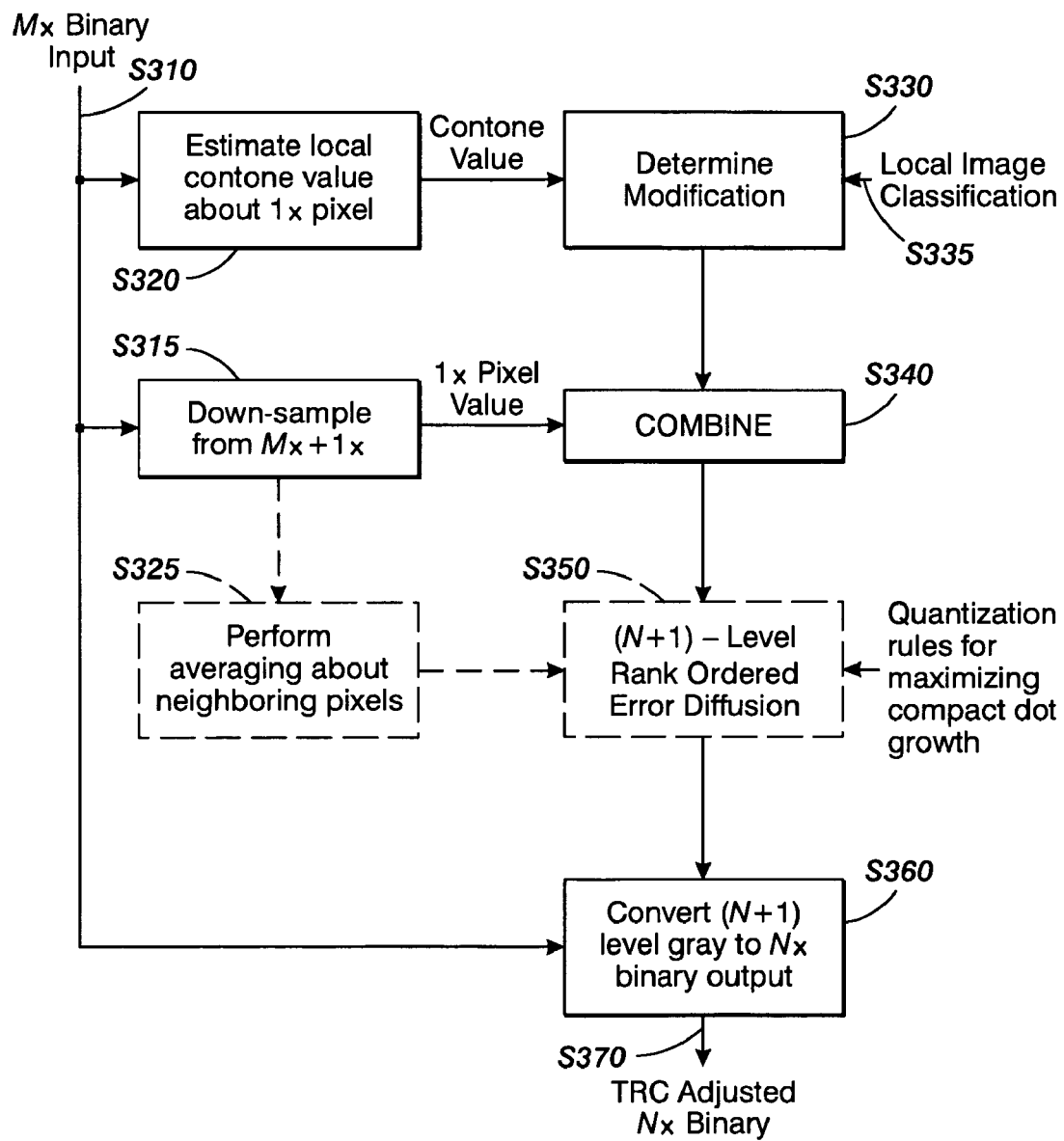
FIG. 14 is a flow chart outlining an exemplary embodiment of a method for controllable TRC adjustment.

FIG. 14 is a flow chart outlining an exemplary embodiment of a method for controllable TRC adjustment. It is desired to provide a method for controllable TRC adjustment wherein the received or input image at an input resolution M×, the image is processed at a processing resolution 1×, for example, and the processed image being output is at an output resolution N×. In some situations the input resolution, the processing resolution and the output resolution may be the same. However, in other situations it may be necessary and/or desirable for one or all of the resolutions to be different. In some embodiments, such differences in resolutions may exist.

Generally, the exemplary method illustrated in FIG. 14 involves estimating a local contone or gray level about an M× target pixel, which in some embodiments is comprised of M high addressable pixel events, and determining a modification value for the target pixel based on the estimated local contone or gray level value and, in some embodiments, local image structure information. The method further involves modifying the target pixel value or, if necessary, a down-sampled version (down-sampled to pixel sampling resolution of the image processing module) of the target pixel based on the determined modification value, performing real-time hardware implementable error diffusion at the pixel resolution of the processing module to render the image as a N+1 level gray image (dashed box in FIG. 14), and converts a N+1 level gray image to an N× binary output or high addressable image (dotted box in FIG. 14). The process further involves outputting a TRC adjusted N× binary image.

According to the exemplary embodiment shown in FIG. 14, steps S310, S320 and S330 operated on an M× pixel clock and incorporate down-sampling of the input image. Step S330 allows for information regarding a local image structure or image features such as edge positions, slopes, and uniformity of pixel values to be input. Step S350 is the ROED step and step S360 simplifies the rank ordering process. Step S370 is a function for converting the 1× image to an image with high addressability such as, for example, an 8× addressability binary image.

The process illustrated in FIG. 14 begins at step S310 where a binary image is input with a given resolution M (i.e., M× input image). The input image resolution M may be 4, for example. Then in step S320, the local gray-scale value is estimated about a selected 1× target pixel in the halftoned image. The local gray scale value may be estimated using, for example, a filter specially designed for the process, descreening, image classification, different halftone frequencies, error diffusion or line art.

Figure 15:
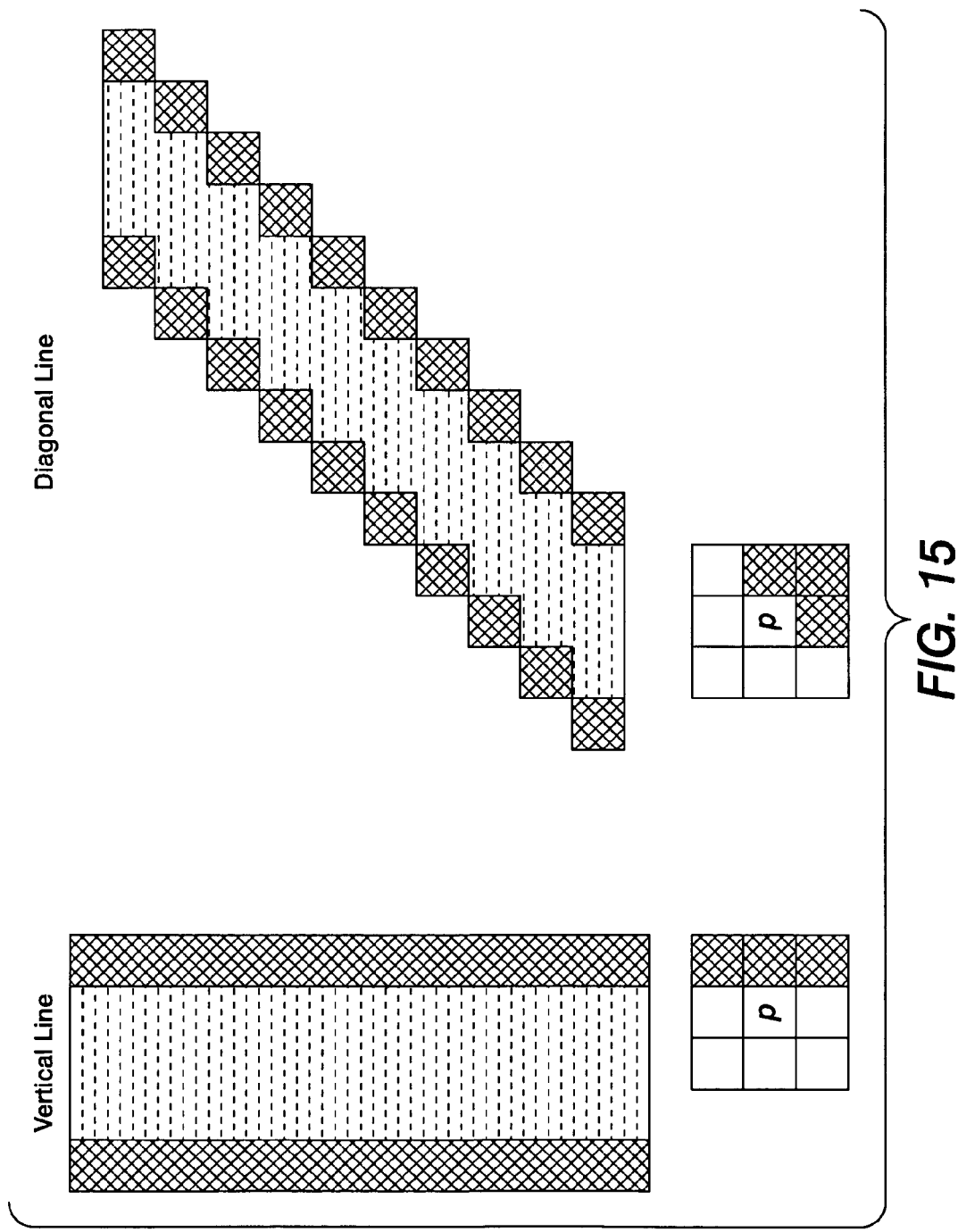
FIG. 15 illustrates an example of line art used to show the need for context dependant modification values.

After the contone value for the neighborhood of the selected target pixel is estimated, the method proceeds to step S330 where a modification value for the selected target pixel, based on the input gray level (i.e., estimated gray level) and the local image classifications which are determined in step S335, is determined. Generally, when different image classes are considered (e.g., different halftone frequencies, error diffusion, line art, local image structure), it is desirable to process and adjust a pixel based not only on the gray level of the pixel, but also on the local image class and image structure about the pixel. For example, different halftone frequencies may require different modification LUTs to achieve the desired TRC. In addition, lines at different orientations and/or of different widths may require particular LUTs to achieve a particular darkness or width aim. Consider the vertical and diagonal lines illustrated in FIG. 15. These lines have similar thickness, but to maintain their relative thicknesses after the TRC modification, different levels of edge adjustment are required. In FIG. 15, the vertical line receives an additional width of 5 8× high addressable pixel additions on each side of the line. The diagonal line receives 7 8× high addressable pixel additions on each side of the line. The effect on line width is comparable, maintaining line isotropy. This is achieved by assigning a larger modification value to the contextual patterns associated with the diagonal line and a smaller modification value with the contextual patterns of the vertical line, as illustrated by the context of the target pixel, p illustrated in FIG. 15.

In view of the forgoing, in one exemplary, in step S335 local image classifications are determined. For example, local image may be classified using an image classifier which can distinguish between halftone or line art, recognize local line structure, and possibly distinguish between types of halftones. The classification step S335 may identify edge orientations and corner structure and such classifications are useful for compensating for the unsymmetrical nature of a diffusion mask. The classification obtained via step S335 may be performed in real-time processing in sync with the controllable TRC adjustment process or it may be performed off-line and the results passed to this process.

Next, the process proceeds to step S340, where the determined modification value for the selected pixel is combined with a down sampled target pixel value. In the exemplary embodiment, if the target pixel is not at 1×, the target pixel will be down-sampled to 1× using an averaging process to obtain an average value of the target pixels during step S315. Step S315 may include an averaging operation that utilizes values of neighboring pixels. Then, the pixel modification value determined in step S330 is used to modify the down-sampled target pixel value. The pixel modification value may, for example, be added to or subtracted from the down-sampled target pixel value.

Next, the process proceeds to step S350 where ROED is performed. If the input image is in binary format, some form of blurring is applied to the binary pixel values to obtain a distribution of gray values for the neighboring pixels for the purpose of ranking those pixels. This blurring could include either averaging high addressable subpixels within the pixels, or averaging values of pixels or subpixels within a small neighborhood about the target pixel. This is accomplished in step S325, where averages of neighboring pixels are determined, if necessary, and used during step S350 for ranking to render the image to an N+1 level gray image. For example, for an 8× high addressability input, the image may be rendered as a 9-level gray image. Error calculation and diffusion by ranking are two aspects of ROED relevant to the disclosure. A flow chart of the ROED process is illustrated in FIG. 14. U.S. patent application Ser. No. 11/013,787, the subject matter of which is incorporated herein by reference in its entirety, discloses a hardware implementable improved ROED process which may be used.

In some cases, it may be necessary to utilize a method for ROED halftoning which is capable of receiving an image at an input resolution M×, processing the image at a processing resolution 1×, for example, and outputting an image at an output resolution N×. The processing resolution may be any integer or non-integer multiple of a base or reference resolution and the input resolution and the output resolution may be any integer or non-integer multiple thereof (including 1 such that they would be the same). For example, the processing resolution may be 1.5×, 2×, 3×, etc. In the following description of exemplary embodiments, to simplify the discussion, a processing resolution of 1×, for example, will be used and integer multiples thereof will be used for the input resolution and the output resolution.

Further, in some situations the input resolution, the processing resolution and the output resolution may be the same. In other situations it may be necessary and/or desirable for one or all of the resolutions to be different. Thus, some embodiments may have the same input, processing and output resolutions, some embodiments may have different input, processing and output resolutions, some embodiments may have same input and processing resolutions but a different output resolution, and some embodiments may have same processing and output resolutions, but a different input resolution, etc.

According to the exemplary embodiment shown in FIG. 14, step S310 provides an input image at M× addressability, step S315 performs down-sampling of the input image to a processing resolution (e.g., 1×). Step S325 involves an averaging operation that utilizes values of neighboring pixels, where averages about neighboring pixels can be used for ranking in step S350. Step S350 is the ROED step during which the downsampled image is subjected to ROED, and step S360 is a function for converting the N+1 level gray image to an image with high addressability such as, for example, an N× addressability binary image. For example, in step S370, a TRC adjusted 8× image may be outputted.

More particularly, the process begins by providing an input image at an input resolution M×. In the exemplary embodiment, if the target pixel is not at the processing resolution 1×, for example, the target pixel will be down-sampled to the processing resolution using an averaging process to obtain an average value of the target pixel during step S315.

Next, the process proceeds to step S350 where ROED is performed to render the image to an N+1 level gray image. For example, for an 8× high addressability input, the image may be rendered as a 9-level gray image. Error calculation and diffusion by ranking are two important aspects of ROED. A flow chart of an exemplary ROED process is illustrated in FIG. 16.

Figure 16:
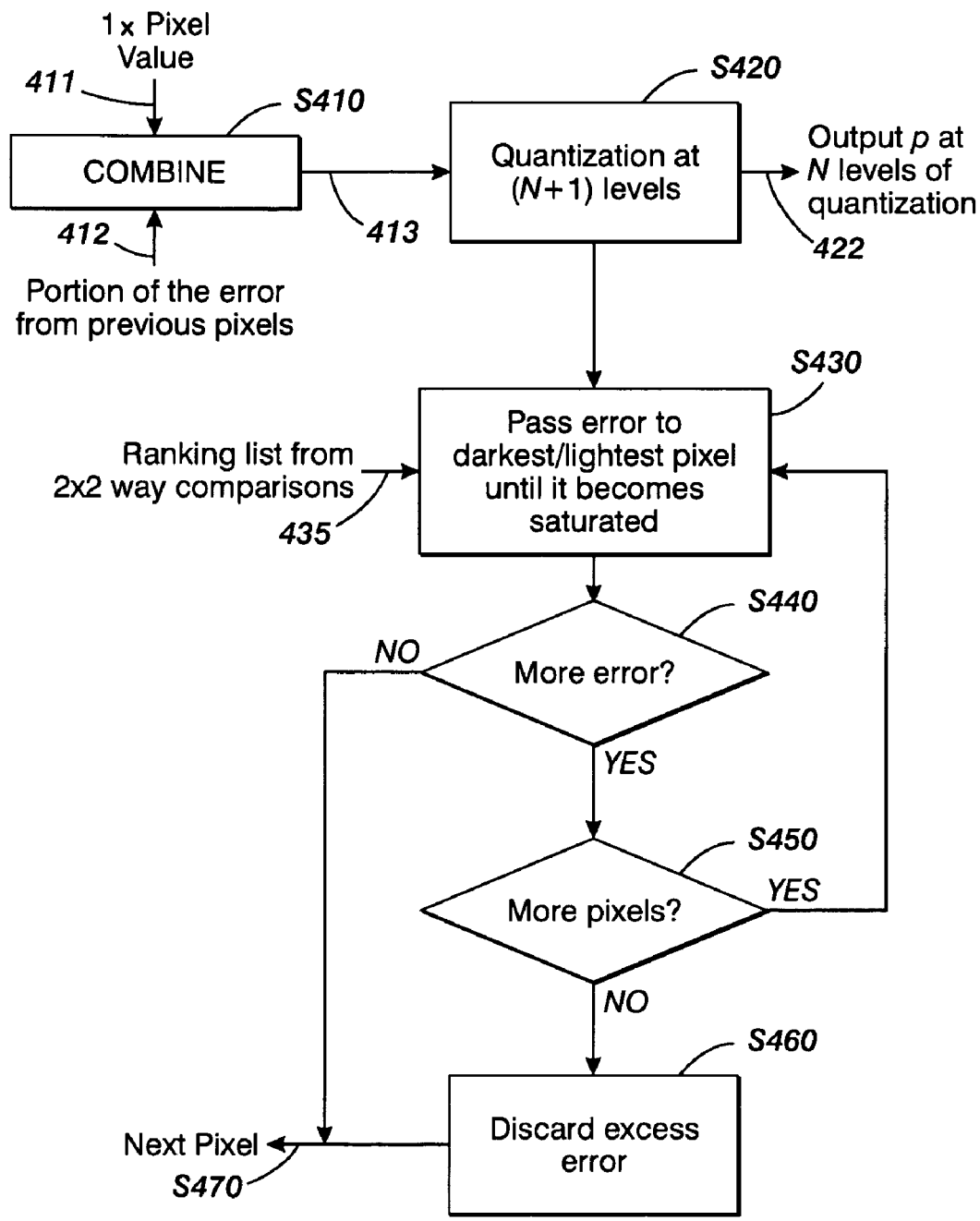
FIG. 16 illustrates a flow chart outlining an exemplary method for performing ROED.

FIG. 16 is a flow chart outlining an exemplary method for performing ROED. As shown in FIG. 16, in step S410, quantization error 412 from diffusion of previously processed pixel neighbors is added to the 1× target pixel value 411 to update the value of the target pixel p.

In the exemplary embodiment illustrated in FIG. 16, in step S420, the output pixel value and error value are computed with N+1 quantization levels based on N addressability. For example, in one exemplary embodiment, the output pixel value 422 and the error value are computed based on 9 quantization levels (e.g., 0, 32, 64, 96, 128, 160, 192, 224, and 256) which are stored as a LUT. At step S420, the difference between the updated value of target pixel 413 and the corresponding LUT value determines the error from pixel p due to the 9-level quantization.

Next, in step S430, the error is passed out to error memory buffers for the pixels within the mask according to the ranked list 435 of the pixels and the sign of the error. The amount of error a neighboring pixel can receive, depends on the pixel's value relative to a predefined saturation limit. The saturation limit is often defined as 0 and 255 for 8 bit memory buffers. However, a negative number or a number above 255 can be allowed and generally does not affect the flow of the process. For example, in some embodiments, higher quantization and parameterized clipping limits may be used. In some embodiments, for example, saturation limits of −255 and 511 for a 10 bit signed memory buffer are employed. If the next darkest/lightest pixel is saturated, in step S440 it is determined whether there is more error. If there is no more error to be passed, the process proceeds to step S470, where the process repeats for the next pixel. If, however, there is still error remaining to be passed (S440:Yes), then the process proceeds to step S450 where it is determined if there are more pixels. If it is determined that there are more pixels, the process returns to step S430 where all or some of the remaining error is distributed to the next darkest/lightest pixel until that pixel becomes saturated or there is no more error to be passed. Steps S430 and S440 are repeated until either there are no more pixels to pass error onto (S450:No) or there is no more error to pass (S440:No). If, however, at step S450 it is determined that there are no more pixels (S450:No), then the excess remaining error is discarded in step S460. The process then repeats for the next pixel at S470 until all pixels are processed.

FIG. 17 illustrates a predefined diffusion mask 500 which may be employed for a full ROED algorithm for a target pixel. To determine the error distribution within the mask, full ROED requires a darkness/lightness ranking of all pixels within a predefined mask (e.g., pixels a-j of the diffusion mask 500 shown in FIG. 17). For example, when the error from pixel p is positive, all or part of the error is first added to the darkest pixel on the ranked list. The amount of the error (i.e., all or part) which is added depends on the difference between the pixel's value and the predefined threshold of the pixel. Thus, an amount of the error which would result in the value of the pixel being equal to or less than a predefined threshold (saturation, i.e., 0 or 255) may be added. All or part of the remaining error, if any, is then added to the next darkest pixel on the list, again so long as the resulting pixel value is equal to or less than the predefined threshold. The process continues until it is determined that no error or pixels remain in the mask. On the other hand, for example, when the error from pixel p is negative, all or part of the error is first added to the lightest pixel on the ranked list. The amount of the error (i.e., all or part) which is added depends on the difference between the pixel's value and the predefined threshold (saturation, i.e., 0). Thus, an amount of error which would result in the value of the pixel being equal to or greater than the saturation may be added. All or part of any remaining error is then added to the next lightest pixel on the list, again so long as the resulting pixel value is equal to or greater than the predefined threshold. The process continues until it is determined that no error or pixels remain in the mask.

The full ROED method described above preserves the compactness of clustered dot halftones without introducing undesirable texture artifacts. However, a full ranking of 10 or more pixels is generally not practical for hardware implementation.

A reduced or improved ROED process, uses pairs of 2-way comparisons. A smaller mask 600, as shown in FIG. 18, for example, may also be used. In an embodiment where a smaller diffusion mask, such as the exemplary mask illustrated in FIG. 18 is used and a paired comparison is performed 2 pairs of 2-way comparisons among 4 pixels (i.e., a, b, c and d) may be performed. The exemplary mask 600 shown in FIG. 18 utilizes 4 pixels compared to the 10 pixels utilized by the mask 500 shown in FIG. 17. The mask 600 shown in FIG. 18 shortens the distance of error propagation in the fast-scan direction, which in turn results in a distance symmetry in the fast-scan direction and the slow-scan direction (e.g., direction substantially perpendicular to the fast-scan direction). This symmetry improves the uniformity treatment of line art. That is, the effect on line width is roughly isotropic (the effect on width is the same in all directions). The longer mask 500, shown in FIG. 17, may result in an observable uneven treatment of vertical and horizontal lines when applied at a 1× and 2-quantization level process.

Another feature is the use of position dependent rankings. For example, pixels of the diffusion mask that have a shorter distance to the target pixel are ranked higher than pixels that are more distant. In some embodiments, 2 pairs of 2 way comparisons are performed between pixels a and c, and between pixels b and d, as illustrated in FIG. 18. As discussed above, such a ranking method can be performed instead of the full ranking of 10 pixels to determine the error distribution among the pixels within the mask. In the exemplary embodiment, pixels a and c are assigned a higher ranking than pixels b and d because pixels a and c are closer (e.g., have a common side instead of only a common corner) to the target pixel p. Although in this exemplary embodiment, the diffusion mask involves pixels which are immediately adjacent (i.e., share a common side or corner) to the target pixel, in some embodiments one or all the "neighboring" pixels may not be immediately adjacent to the target pixel. Further, while the mask is illustrated as a combination of boxes, each corresponding to a pixel, for example, pixels are not necessarily in the shape of a box (i.e., square) and can have any general shape (e.g., circle, ellipse, irregular blob, random, etc.). Further, the pixels may be ranked, for example, from darkest to lightest or lightest to darkest based on the error to be diffused. That is, the type of ranking (e.g., lightest to darkest) may be determined based on the error that is to be diffused and/or other features of the pixel or image. In an embodiment employing the exemplary mask illustrated in FIG. 18, for example, in a rank list ranging from the darkest to the lightest pixels, the darker pixel between pixels a and c is ranked first and the lighter pixel between pixels a and c is ranked second, the darker pixel between pixels b and d is ranked third and the lighter pixel between pixels b and d is ranked fourth. This ranking can be stated mathematically as MAX[a, c], MIN[a, c], MAX[b, d], MIN[b, d]. This simplified ranking can efficiently be implemented in real-time hardware, whereas the full ROED method, which requires more comparisons is considerably less efficient when implemented in real-time hardware.

FIG. 19 illustrates a flow chart of an exemplary embodiment involving 2 pairs of 2-way comparisons between pixels a and c, and between pixels b and d for ranking the pixels from the darkest to the lightest using the exemplary diffusion mask illustrated in FIG. 18. In the exemplary embodiment, pixels a and c take precedent over pixels b and d on the ranking list because pixels a and c are the closest neighbors of the target pixel p. In step S1510 two (2) pairs of pixels are input. Pixels a, b correspond to the first pair and pixels c, d correspond to the second pair. Next, in step 1520 inputted pixels a and c are compared. In this exemplary embodiment, if pixel a is darker than (>) pixel c, then pixel a is ranked first and pixel c is ranked second. If on the other hand, pixel c is darker than (>) pixel a then pixel c is ranked first and pixel a is ranked second.

If the pixels are, for example, to be ranked from the lightest pixel to the darkest pixel, if pixel a is lighter than (<) pixel c, then pixel a is ranked first and pixel c is ranked second. If, on the other hand, pixel c is lighter than (<) pixel a, then pixel c is ranked first and pixel a is ranked second.

After ranking pixels a and c, in step S1530 pixels b and d are similarly compared. If pixel b is darker than pixel d then pixel b is ranked third and pixel d is ranked fourth. If on the other hand, pixel d is darker than pixel b then pixel d is ranked third and pixel b is ranked fourth.

If the pixels are, for example, to be ranked from the lightest pixel to the darkest pixel, if pixel b is lighter than (<) pixel d, then pixel b is ranked third and pixel d is ranked fourth. If, on the other hand, pixel d is lighter than (<) pixel b, then pixel d is ranked third and pixel b is ranked fourth.

In the exemplary embodiment, if, the diffused error is positive, ranking the pixels from darkest to lightest is employed. However, in the exemplary embodiment, if the diffused error is negative, ranking of the pixels from lightest to darkest is employed. Diffusing the error in the order of the ranking contributes to achieving the desired compact dot growth objective.

Next, in step S1540 the pixels are ranked from the first to the fourth. A LUT can be used in this comparison process to reduce computation and build in flexibility for future image quality tuning. Thus, this simplified ranking can be practically and efficiently implemented in real-time hardware.

In another exemplary embodiment involving multiple pairs of 2-way comparison, a different, and possibly larger, mask may be employed. For example, in an embodiment using the mask of FIG. 17, an example of paired comparison hierarchy may involve comparing pixels a, g to obtain a first result, comparing pixels f, h to obtain a second result, comparing pixels b, i to obtain a third result, and comparing pixels c, j to obtain a fourth result. These results obtain from these comparisons can be used to rank-order the pixels based, for example, on the distances between the pixels being compared and the target pixel. For instance, the ranking for this example could be ordered as MAX[a, g]. MIN[a, g], MAX[f, h], MIN [f, h], MAX[b, i], MIN[b, i], MAX[c,j], MIN[c,j]. Other masks and other pairing schemes may be used.

The full ROED method described above preserves the compactness of clustered dot halftones without introducing undesirable texture artifacts. However, a full ranking of 9 or more pixels is not practical for hardware implementation.

According to one exemplary embodiment, a reduced ROED, which utilizes a smaller mask, as shown in FIG. 18, with 2 pairs of 2-way comparisons among 4 pixels (i.e., a, b, c and d). The mask shown in FIG. 18 utilizes 4 pixels compared to the 9 pixels utilized by the mask shown in FIG. 17. The mask shown in FIG. 18 shortens the distance of error propagation in the fast-scan direction, which in turn results in a distance symmetry in the fast and slow scan directions. This symmetry improves the uniformity treatment of line art. That is, line width adjustments are roughly isotropic (they receive the same width modification in all directions). The longer mask 500 shown in FIG. 17 results in an observable uneven treatment of vertical and horizontal lines when applied at a 1×and 2-quantization level process.

Another aspect is the use of position dependent rankings wherein pixels of the diffusion mask that have a shorter distance to the target pixel are ranked higher than pixels that are more distant. In one embodiment 2 pairs of 2-way comparisons are performed between pixels a and c, and b and d, as illustrated in FIG. 19, instead of the full ranking of 9 pixels to determine the error distribution among the pixels within the mask. Pixels a and c are assigned a higher ranking than pixels b and d. For example, in a rank list ranging from the darkest to the lightest pixels, the darker pixel between pixels a and c is ranked first the lighter one is ranked second, the darker one between b and d is ranked third and the lighter one is ranked forth. This simplified ranking can be efficiently implemented in real-time hardware whereas the full ROED method requires more comparisons and is therefore considerably less efficient when implemented in real-time hardware.

FIG. 19 illustrates a flow chart of the 2 pairs of 2-way comparisons embodiment, ranking from the darkest to the lightest pixels, with the exemplary diffusion mask illustrated in FIG. 18. Pixels a and c take precedent over pixels b and d on the ranking list because pixels a and c are the closest neighbors of the target pixel p. In step S1510 two (2) pairs of pixels are inputs. Pixels a, b correspond to the first pair and pixels c, d correspond to the second pair. Next, in step 1420 inputted pixels a and c are compared. If pixel a is darker than (>) pixel c, then pixel a is ranked first and pixel c is ranked second. If on the other hand, pixel c is darker than (>) pixel a then pixel c is ranked first and pixel a is ranked second. In a similar ranking from the lightest to darkest pixels, pixels a and c take precedent over pixels b and d on the ranking list because pixels a and c are the closest neighbors of the target pixel p. If pixel a is lighter than (<) pixel c, then pixel a is ranked first and pixel c is ranked second. If on the other hand, pixel c is lighter than (<) pixel a then pixel c is ranked first and pixel a is ranked second.

Next, in step S1530 pixels b and d are similarly compared. If pixel b is darker than pixel d then pixel b is ranked third and pixel d is ranked fourth. If on the other hand, pixel d is darker than pixel b then pixel d is ranked third and pixel b is ranked fourth. In a similar ranking from the lightest to darkest pixels, if pixel b is lighter than pixel d then pixel b is ranked third and pixel d is ranked fourth. If on the other hand, pixel d is lighter than pixel b then pixel d is ranked third and pixel b is ranked fourth.

If the diffused error is positive, ranking the pixels from darkest to lightest is employed. However, if the diffused error is negative, ranking the pixels from lightest to darkest is employed. Diffusing the error in the order of the ranking contributes to achieving the desired compact dot growth objective.

Next, in step S1540 the pixels are ranked from the first to the fourth. A LUT can be used in this comparison process to reduce computation and build in flexibility for future image quality tuning. Thus this simplified ranking can be practically and efficiently implemented in real-time hardware.

Figure 20:
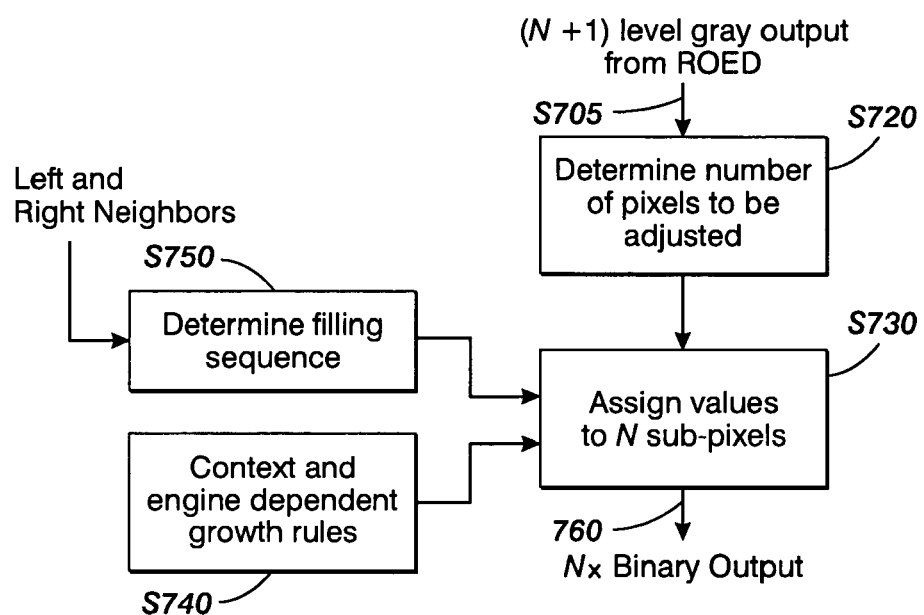
FIG. 20 is a flow chart outlining an exemplary method for converting a 9 level gray image to an 8× binary output.

Referring back to FIG. 14, the method proceeds to step S360 to convert the N+1 level gray image to a high addressable binary output N× before outputting the TRC adjusted N× binary image in step S370. FIG. 20 illustrates an exemplary process for step S360 in more detail. Generally, the N+1 level gray output is converted to an N× binary output 760 based on the knowledge of the original pixel ranking and its left and right neighboring pixels.

As shown in FIG. 20, in step S705 the N+1 level gray (e.g., 9 level gray) output from ROED processing is input. In step S720, the number of pixels to be adjusted is determined. For example, the number of on and off output high addressable pixels are determined. The value D (not shown) obtained from step S705 corresponding to the gray level output from ROED processing is used to determine the number of sub-pixels for that pixel in the subsequently created intermediate image. The number of high addressable sub-pixels to be set to black is computed as T=INT(D/L), where L=QIN, INT( ) means round to the closest non-negative integer, and Q is the quantization level. For example, for 8× addressability and 256 level quantization, the number to toggle T is T=INT(D/32). The formula is easily modified for different levels of addressability or quantization. This quantization stage can also accept context and/or engine dependent growth rules to increase repeatability.

Quantizing the target pixel is generally dependent on the target pixel context. For a given level of gray, the left/right/center/split positional justification depends on the context. In addition, a number of high addressable pixels may be rounded up or down in order to achieve an engine dependent minimum size constraint. This can be achieved, for example, using context and/or engine dependent growth rules in step S740. These growth rules may require, for example, left-sided justification to be chosen based on one context, and centered justification with a minimum size constraint be imposed based on another context. After the modified target pixel value is quantized, for example, by the above ROED process in step S360, the process proceeds to step S370, where a print-ready image data is output to the print/marking engine 27, for example.

In step S730, values are assigned to the high-addressable sub-pixels based on (a) a comparison made between the down-sampled Left (L) and Right (R) neighbors during step S750, and (b) the target pixel scaled up to a high addressability or a higher high addressability, such as, for example, a 4× binary input scaled up to an 8× binary image. In an exemplary embodiment, the following rules are used to assign values to the sub-pixels:

(1) The distribution of the filling sequence of the 8-subpixels of the N× binary input in step S750 takes higher priority than the target pixel scaled to high addressability in step S740.
(2) The filling sequence is determined in step S750 by the following rules:
  (a) If operating by setting sub-pixels to black: i) If L>R, from left to right, set sub-pixels to black until the number of sub-pixels need to be set is reached; ii) If the R>L, from right to left, set sub-pixels to black until the number of sub-pixels need to be set is reached; and iii) If L=R, from center to two sides, set sub-pixels to black symmetrically until the number of sub-pixels need to be set is reached.
  (b) If operating by setting sub-pixels to white: i) If L>R, from right to left, set sub-pixels to white until the number of sub-pixels need to be set is reached; ii) If R>L, from left to right, set sub-pixels to white until the number of sub-pixels need to be set is reached; and iii) If L=R, from center to two sides, set sub-pixels to white symmetrically until the number of sub-pixels need to set is reached.

In embodiments employing context and/or engine-dependent growth rules, context and/or engine dependent growth rules addresses the problem that an isolated sub-pixel region cannot generally be reproduced in a consistent manner by many marking processes. It is desirable to avoid stressful imaging events (i.e., isolated small dark spots that are difficult to develop or small gaps surrounded by exposed areas that get plugged due to dot growth) in order to improve repeatability. In some embodiments, a growth facilitator provides context and/or engine dependent growth rules in step S740. The growth facilitator determines quantization rules in addition to the aforementioned quantization table. The growth facilitator will not permit an isolated sub-pixel to be used if diffusing the error is a viable alternative. For example, if quantizing the modified target pixel value suggests generating an isolated ⅛ pixel output, the growth facilitator will demand that the isolated ⅛ pixel is removed, and the resulting positive error is diffused to one of the available neighboring gray pixels. However, if a neighboring gray pixel is not available, the growth facilitator will, for example, implement a growth rule resulting in a more easily reproduced ⅜ pixel spot to be output, and the resulting negative error be diffused. It is generally desirable to avoid fragile features such as small spots and gaps because these unreliable features are detriments to the quality and reproducibility.

The assignment rule may be adapted to different engine responses. For example, when a marking/print engine cannot reliably reproduce a single sub-pixel or some small number of sub-pixels, its surrounding context should be considered so that this small group of sub-pixel-sized events are eliminated or minimized, as discussed above with regard to step S740. Further, the context and/or engine dependent growth rules may have different definitions for the size of a small sensitive sub-pixel group for a white group or a black group.

As discussed above, the process then returns to step S310 where a next target pixel is selected. Steps S315-S370 are repeated until all of the pixels corresponding to a portion or the entire received image are modified according to steps S350-S370. The process ends after all the pixels of the desired portion or the entire image, for example, are adjusted.

While the above description of various exemplary embodiments refer to high addressability, the methods implementing one or more of the features discussed above can also be used with pulse-width-pulse-modulated (pwpm) or LED bar marking processes.

It should be appreciated that the systems and methods described herein can be implemented on a general purpose computer. However, it should also be appreciated that the various embodiments of the features described herein can also each be implemented on a special purpose computer, a programmed microprocessor or micro-controller and peripheral integrated circuit elements, an application specific integrated circuit (ASIC) or other integrated circuit. In general, any device capable of implementing the flowcharts shown in FIGS. 1, 3,14, 16, 19 and 20 can be used to implement any of the methods for performing improved ROED.

The assignment rule may be adapted to different engine responses. For example, when a marking/print engine cannot truthfully reproduce a single sub-pixel. Hence, when a single sub-pixel is to be filled, its surrounding context should be considered so that single sub-pixel events are minimized, as discussed above and illustrated in FIG. 6.

While the exemplary embodiments have been outlined above, many alternatives, modifications and variations will be apparent to those skilled in the art. Accordingly, the exemplary embodiments, as set forth above, are intended to be illustrative and not limiting. Modifications and alterations will occur to others upon reading and understanding this specification. While the exemplary systems and methods have, for the most part, been described in terms of preparing an image for rendering on a binary device, preparing an image for rending on a device with an increased number of quantization levels is contemplated. Those skilled in the art will understand how to modify exemplary embodiments for a number of quantization levels above two.

While the exemplary systems and methods have, for the most part, been described in terms of applying error to pixel values, it is to be understood that error can equivalently be applied to threshold values. It is intended that all such modifications and alterations are included insofar as they come within the scope of the appended claims or equivalents thereof.

What is claimed is:

1. A method for controlling a tone reproduction curve of a halftone digital image, the method comprising:
   receiving the halftone digital image;
   selecting a target pixel and a neighborhood area of the selected target pixel;
   estimating a local gray value of the selected target pixel and the selected neighborhood area;
   determining a modification value for the selected target pixel based on a relationship between the estimated local gray value and a desired gray level;
   modifying a pixel value of the selected target pixel using the determined modification value;
   determining a quantization error for the selected target pixel, wherein when the determined quantization error is not equal to zero, the method further comprising:
   selecting a diffusion mask, the mask relating to the target pixel and pixels neighboring thereto;
   diffusing the determined quantization error using a rank-ordered error diffusion to at least one pixel based on the selected diffusion mask, the rank-order error diffusion acting on only four pixels of the neighboring area and comprising:
      receiving a first pair of adjacent pixel values selected from the neighboring area for a first pixel pair including a first adjacent pixel and a second adjacent pixel;
      receiving a second pair of different adjacent pixel values selected from the neighboring area for a second pixel pair including a third adjacent pixel and a fourth adjacent pixel;
      determining a ranking order of the first, second, third and fourth adjacent pixels by comparing pixel values of the first, second, third and fourth adjacent pixels;
      determining which of the first and second pair is the closest neighbor to the target pixel; and
      diffusing the determined quantization error using only the first, second, third and fourth adjacent pixels based on the determined ranking order of the first, second, third and fourth adjacent pixels, the error being diffused first to the determined closest neighbor pair by diffusing the error to the adjacent pixel of the four pixels in the determined closest pair having the highest ranking order, followed by diffusion of a portion of any remaining error to the remaining pixel of the closest pair, any remaining error then being diffused to the remaining pair of the first and second pair, the remaining error being diffused first to the adjacent pixel in the remaining pair having the highest ranking order, and then diffused to the other pixel of the remaining pair; and
   performing a blurring operation about neighboring pixels prior to performing rank-order error diffusion when the received halftone digital image is a binary image.

2. The method of claim 1, wherein the estimating step comprises using at least one of a low pass filter and a look up table, the at least one of the low pass filter and the look up table providing a relationship between at least one input pixel value and a gray value for the at least one input pixel prior to halftoning, or a gray level that would be perceived for the at least one input pixel on a print of the received image.

3. The method of claim 1, wherein the steps of selecting the target pixel, estimating, determining the modification value, modifying, determining the quantization error, selecting the diffusion mask, and diffusing steps are repeated for all of pixels encompassed by a portion of or all of the received image.

4. The method of claim 1, wherein the desired gray value is a gray value desired for at least one of adjusting a darkness, a brightness and a contrast of at least a portion of the received halftone digital image.

5. The method of claim 1, wherein the desired gray value is a gray value desired for at least one of user preference, emulation of a different target printer, emulation or compensation for a characteristic of a given marking engine.

6. The method of claim 1, wherein determining a modification value is based on the estimated gray level and local image classifications of the image.

7. A method of adjusting a TRC of an image, the method comprising:
   receiving the image, the received image being at an input resolution;
   resampling the image to a processing resolution when the input resolution and the processing resolution are not same;
   processing the image using rank-ordered error diffusion; and
   resampling the processed image to a desired output resolution for the image when the processing resolution and the output resolution are not same, the resampling of the processed image to the desired output resolution including:
   determining a difference D between an N+1 level gray output of the rank-ordered error diffusion process for a target pixel and a resampled gray input for the target pixel; and
   determining a number of neighbor pixels of the selected target pixel that will be toggled T, wherein T=INT(D/

L), where L=Q/N, Q is a quantization level and N is the desired output resolution.

8. The method of claim 7, wherein the resampling the processed image to an output resolution comprises resampling the processed image to generate a high addressable version of the processed image.

9. The method of claim 7, wherein the resampling the image to a processing resolution comprises averaging a plurality of high addressable sub-pixels of the received image.

10. The method of claim 7, further comprising:

determining a filling sequence for assigning values to the neighbor pixels;

filling the neighbor pixels until T is reached; and outputting the processed image at the desired output resolution.

11. The method of claim 10, wherein determining a filling sequence comprises comparing a resampled left neighbor and a resampled right neighbor of the selected target pixel, and a context dependent growth rule for improving repeatability by avoiding stressful binary patterns.

12. A tone reproduction curve controller, comprising:

a digital halftone image receiver;

a local gray value estimator that receives the received digital halftone image from the digital halftone image receiver and estimates a local gray value of a selected target pixel and a selected neighboring area of the selected target pixel;

a modification value determiner that determines a modification value for the selected target pixel based on a relationship between the estimated local gray value and a desired gray value;

a pixel value modifier that modifies a pixel value of the selected target pixel using the determined modification value;

a binary image processor that performs a blurring operation about neighboring pixels; and a pixel quantizer capable of rank-order error diffusion that determines a quantization error for the selected target pixel and selects a diffusion mask relating to the target pixel and pixels neighboring thereto, wherein when the determined quantization error is not equal to zero, the determined quantization error is diffused to at least one of the neighboring pixels based on the selected diffusion mask, the rank-order error diffusion acting on only four pixels of the neighboring area through operation of the pixel quantizer to:

receive a first pair of adjacent pixel values selected from the neighboring area for a first pixel pair including a first adjacent pixel and a second adjacent pixel;

receive a second pair of different adjacent pixel values selected from the neighboring area for a second pixel pair including a third adjacent pixel and a fourth adjacent pixel;

determine a ranking order of the first, second, third and fourth adjacent pixels by comparing pixel values of the first, second, third and fourth adjacent pixels;

determine which of the first and second pair is the closest neighbor to the target pixel; and diffuse the determined guantization error using only the first, second, third and fourth adjacent pixels based on the determined ranking order of the first, second, third and fourth adjacent pixels, the error being diffused first to the determined closest neighbor pair by diffusing the error to the adjacent pixel of the four pixels in the determined closest pair having the highest ranking order, followed by diffusion of a portion of any remaining error to the remaining pixel of the closest pair, any remaining error then being diffused to the remaining pair of the first and second pair, the remaining error being diffused first to the adjacent pixel in the remaining pair having the highest ranking order, and then diffused to the other pixel of the remaining pair, wherein when the received halftone digital image is a binary image, the binary image processor performs the blurring operation prior to the pixel quantizer performing rank-order error diffusion of the image.

13. The tone reproduction curve controller of claim 12, wherein the local gray value estimator estimates the local gray value of the selected target pixels and the selected neighboring area using at least one of a low pass filter and a look up table, the at least one of the low pass filter and the look up table providing a relationship between at least one input pixel value and a gray value for the at least one input pixel prior to halftoning, or a gray level that would be perceived for the at least one input pixel on a print of the received image.

14. The tone reproduction curve controller of claim 12, wherein the desired gray value is a gray value desired for at least one of user preference, emulation of a different target printer, emulation or compensation of a characteristic of a given marking engine, adjusting a brightness, a darkness and/or a contrast of at least a portion of the received halftone digital image.

\* \* \* \* \*